(12) United States Patent
Discekici et al.

(10) Patent No.: US 12,466,127 B2
(45) Date of Patent: Nov. 11, 2025

(54) MULTI-FLUID KIT FOR THREE-DIMENSIONAL (3D) PRINTING, AND THREE-DIMENSIONAL PRINTING

(71) Applicant: PERIDOT PRINT LLC, Palo Alto, CA (US)

(72) Inventors: Emre Hiro Discekici, San Diego, CA (US); Mark H. Kowalski, Corvallis, OR (US); Shannon Reuben Woodruff, San Diego, CA (US); Alay Yemane, San Diego, CA (US); Graciela E Negri Jimenez, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 226 days.

(21) Appl. No.: 18/033,685

(22) PCT Filed: Oct. 30, 2020

(86) PCT No.: PCT/US2020/058155
§ 371 (c)(1),
(2) Date: Apr. 25, 2023

(87) PCT Pub. No.: WO2022/093260
PCT Pub. Date: May 5, 2022

(65) Prior Publication Data
US 2023/0398733 A1    Dec. 14, 2023

(51) Int. Cl.
*B29C 64/165* (2017.01)
*B33Y 10/00* (2015.01)
*B33Y 70/10* (2020.01)
*B29K 77/00* (2006.01)

(52) U.S. Cl.
CPC ............ *B29C 64/165* (2017.08); *B33Y 10/00* (2014.12); *B33Y 70/10* (2020.01); *B29K 2077/00* (2013.01)

(58) Field of Classification Search
CPC ........ B29C 64/165; B33Y 10/00; B33Y 70/00
See application file for complete search history.

(56) References Cited

U.S. PATENT DOCUMENTS

| 2012/0198829 A1 | 8/2012 | Gagnon |
| 2019/0375158 A1 | 12/2019 | Crabtree et al. |
| 2020/0238620 A1 | 7/2020 | Crabtree et al. |

FOREIGN PATENT DOCUMENTS

| WO | 2017/069778 A1 | 4/2017 |
| WO | 2018/023833 A1 | 2/2018 |
| WO | 2018/199955 A1 | 11/2018 |
| WO | 2019/201922 A1 | 10/2019 |
| WO | 2020/049186 A1 | 3/2020 |
| WO | WO2020081066 | * 4/2020 |

* cited by examiner

*Primary Examiner* — Edmund H Lee
(74) *Attorney, Agent, or Firm* — Dierker & Kavanaugh, P.C.

(57) ABSTRACT

An example of a multi-fluid kit for three-dimensional (3D) printing includes a fusing agent and a surface treating agent. The fusing agent includes an electromagnetic radiation absorber and a first aqueous vehicle. The surface treating agent includes a second aqueous vehicle, a surfactant, and benzyl alcohol dissolved in the second aqueous vehicle.

15 Claims, 7 Drawing Sheets

MULTI-FLUID KIT FOR THREE-DIMENSIONAL (3D) PRINTING, AND THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial coalescence of the build material, and the mechanism for material coalescence (e.g., curing, thermal merging/fusing, melting, sintering, etc.) may depend upon the type of build material used. For some materials, at least partial coalescence may be accomplished using heat-assisted extrusion, and for some other materials (e.g., polymerizable materials), curing or fusing may be accomplished using, for example, infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
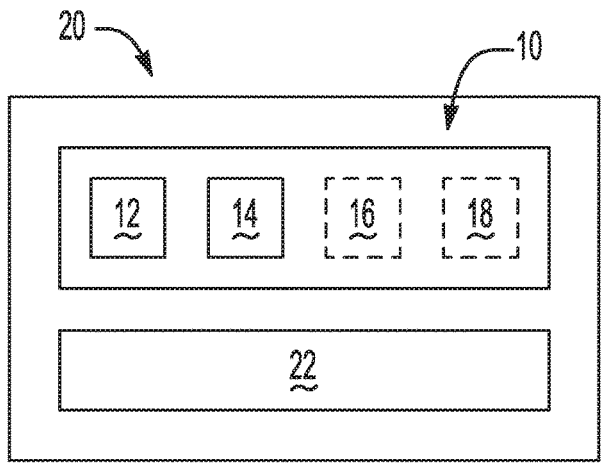
FIG. 1 schematically illustrates an example of a multi-fluid kit and an example of a three-dimensional (3D) printing kit.

Some examples of three-dimensional (3D) printing may utilize a fusing agent (including an electromagnetic radiation absorber) to pattern polymeric build material, such as polyamide build material. In these examples, an entire layer of the polyamide build material is exposed to electromagnetic radiation, but the patterned region (which, in some instances, is less than the entire layer) of the polyamide build material is fused/coalesced and hardened to become a layer of a 3D part. In the patterned region, the fusing agent is capable of at least partially penetrating into voids between the polyamide build material particles, and is also capable of spreading onto the exterior surface of the polyamide build material particles. This fusing agent is capable of absorbing radiation and converting the absorbed radiation to thermal energy, which in turn fuses/coalesces the polyamide build material that is in contact with the fusing agent. Fusing/coalescing causes the polymeric build material to join or blend to form a single entity (i.e., the layer of the 3D part). Fusing/coalescing may involve at least partial thermal merging, melting, binding, and/or some other mechanism that coalesces the polyamide build material to form the layer of the 3D object.

The surface properties of 3D objects printed in this manner may be rough and include defects that are difficult to fix. Both physical and chemical post-process finishing techniques have been used to reduce surface roughness and defects of 3D printed objects. Some physical processes, such as sanding, can deleteriously impact object accuracy and color. Furthermore, polyamides include repeat units with long carbon chain lengths, which render them relatively chemically inert. Because polyamides are relatively chemically inert, they are not readily soluble in many solvents. Thus, chemical finishing processes for polyamide 3D objects may involve harsh (e.g., corrosive, etc.) solvents, such as strong acids, phenols, some aliphatic fluorinated alcohols, etc. Such solvents can complicate post-processing (e.g., may involve more rigorous conditions) and/or may be undesirable.

In the examples disclosed herein, a surface treating agent is jetted on at least some of the polyamide build material during the 3D printing process along with a fusing agent. The portions of the 3D object that are exposed to both the surface treating agent and the fusing agent have reduced surface roughness. The improvement in surface roughness may be due to the combination of i) benzyl alcohol in the surface treating agent and ii) heat used during radiation exposure. The benzyl alcohol and heat may help to solubilize the polyamide build material particles at the 3D object surface. The solubilized particles are able to better coalesce, which can decrease overall roughness. The color uniformity at the 3D object surface may also be improved, as fewer non-fused particles may be present at the surface.

Moreover, the ability to jet the surface treating agent via any suitable inkjet printing technique enables controlled (and potentially varying) surface roughness to be spatially incorporated into the periphery of 3D printed objects at the voxel level.

Throughout this disclosure, a weight percentage that is referred to as "wt % active" refers to the loading of an active component of a dispersion or other formulation that is present, e.g., in the surface treating agent, fusing agent, detailing agent, etc. For example, an electromagnetic radiation absorber, such as carbon black, may be present in a water-based formulation (e.g., a stock solution or dispersion) before being incorporated into the fusing agent vehicle. In this example, the wt % actives of the carbon black accounts for the loading (as a weight percent) of the carbon black solids that are present in the fusing agent, and does not account for the weight of the other components (e.g., water, etc.) that are present in the stock solution or dispersion with the carbon black. The term "wt %," without the term actives, refers to the loading of a 100% active component that does not include other non-active components therein.

3D Printing Multi-Fluid Kits and 3D Printing Kits

FIG. 1 schematically depicts a multi-fluid kit 10 for three-dimensional (3D) printing and a three-dimensional (3D) printing kit 20.

An example of a multi-fluid kit 10 includes: i) a fusing agent 12 including an electromagnetic radiation absorber and a first aqueous vehicle; and ii) a surface treating agent 14 including a second aqueous vehicle, a surfactant, and benzyl alcohol dissolved in the second aqueous vehicle. Some examples of the multi-fluid kit 10 further include a detailing agent 16 including a surfactant, a co-solvent, and water; a coloring agent 18 selected from the group consisting of a black ink, a cyan ink, a magenta ink, or a yellow ink; or both the detailing agent 16 and the coloring agent 18.

Any example of the multi-fluid kit 10 may also be part of a 3D printing kit 20 and/or composition. As such, one example of a 3D printing kit 20 includes: a polyamide build material composition 22; the fusing agent 12 including an electromagnetic radiation absorber and a first aqueous vehicle; and the surface treating agent 14 including a second aqueous vehicle, a surfactant, and benzyl alcohol dissolved in the second aqueous vehicle.

It is to be understood that the agents 12 and 14, or 12, 14, and 16, or 12, 14, 16, and 18 of the multi-fluid kit 10 or the agents 12 and 14, or 12, 14, and 16, or 12, 14, 16, and 18 and the polyamide build material composition 22 of the 3D printing kit 20 may be maintained separately until used together in examples of the 3D printing method disclosed herein. The agents 12 and 14, or 12, 14, and 16, or 12, 14, 16, and 18 and/or build material composition 22 may each be contained in one or more containers prior to and during printing, but may be combined together during printing. The containers can be any type of a vessel (e.g., a reservoir), box, or receptacle made of any material. As an example, the agents 12 and 14, or 12, 14, and 16, or 12, 14, 16, and 18 may be maintained in respective reservoirs/fluid supplies of respective inkjet cartridges, or in separate reservoirs/fluid supplies in a single container (e.g., inkjet cartridge) until they are used during 3D printing.

As used herein, it is to be understood that the terms "set" or "kit" may, in some instances, be synonymous with "composition."

As mentioned above, various agents may be included in the multi-fluid kit 10 and/or 3D printing kit 12 disclosed herein. Example compositions of the surface treating agent 14, the fusing agents 12, the detailing agent 16, the coloring agent 18, and the polyamide build material composition 22 will now be described.

Surface Treating Agent

The surface treating agent 14 includes benzyl alcohol, a surfactant, and an aqueous vehicle. The aqueous vehicle of the surface treating agent 14 may be water or a combination of water and a solvent for benzyl alcohol. In some examples, the surface treating agent 14 consists of the benzyl alcohol, the surfactant, and the aqueous vehicle.

Benzyl alcohol is an aromatic alcohol with the formula $C_6H_5CH_2OH$. The benzyl alcohol may help to solubilize the polyamide build material composition 22 during the 3D printing method.

The amount of benzyl alcohol in the surface treating agent 14 may depend upon the components of the aqueous vehicle and the solubility of the benzyl alcohol in the component(s) of the aqueous vehicle. The solubility of benzyl alcohol in water is about 4 g/mL. As such, when water alone is used as the aqueous vehicle of the surface treating agent 14, the amount of benzyl alcohol may range from greater than 0 wt % to about 4 wt %, based on the total weight of the surface treating agent 14. In these instances, the amount of water in the surface treating agent 14 may be 93 wt % or higher.

To increase the amount of benzyl alcohol in the surface treating agent 14, water may be used in combination with the solvent for benzyl alcohol. The solvent selected may have a higher solubility for benzyl alcohol than water. The inclusion of such a solvent enables the surface treating agent 14 to be prepared with a higher amount of benzyl alcohol, which may be desirable for solubilizing the polyamide build material composition 22 during 3D printing. When water and the solvent are used in combination as the aqueous vehicle of the surface treating agent 14, the amount of benzyl alcohol may range from about 2 wt % to about 20 wt % based on the total weight of the surface treating agent 14. If the benzyl alcohol is more soluble in the selected solvent, the amount may be at the higher end of the given range, and if the benzyl alcohol is less soluble in the selected solvent, the amount may be at the lower end of the given range. In an example, the benzyl alcohol and solvent may be mixed at a ratio of 1:1, and then one of the components may be adjusted based on the miscibility.

The solvent selected may also have a boiling point of 150° C. or higher. As such, some examples of the aqueous vehicle of the surface treating agent 14 include water and a solvent for benzyl alcohol having a boiling point of 150° C. or higher. Some examples of solvents for benzyl alcohol are selected from the group consisting of polyethylene glycol having a weight average molecular weight ranging from about 190 Daltons to about 420 Daltons, 1-(2-hydroxyethyl)-2-pyrrolidone, glycerol, propylene glycol, and combinations thereof. Some of these solvents, such as propylene glycol (bp~188° C.), have a boiling point higher than 180° C. Other of these solvents, such as 1-(2-hydroxyethyl)-2-pyrrolidone (bp~175° C.), propylene glycol 300 (bp>220° C.), propylene glycol 400 (bp~290° C.), and glycerol (290° C.) have a boiling point higher than 200° C.

When water and the solvent are used in combination as the aqueous vehicle of the surface treating agent 14, the solvent for benzyl alcohol may be present in an amount ranging from about 20 wt % to about 60 wt % based on the total weight of the surface treating agent 14. In these examples, the amount of water may range from about 17 wt % to about 80 wt % based on the total weight of the surface treating agent 14.

The surface treating agent 14 may further include the surfactant. Suitable surfactant(s) for the surface treating agent 14 include non-ionic, cationic, or anionic surfactants. It may be desirable to select a surfactant that does not react with the benzyl alcohol. Some example surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, fluorosurfactants, and the like. Some specific examples include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), an ethoxylated low-foam wetting agent (e.g., SURFYNOL® 440 or SURFYNOL® CT-111 from Evonik Degussa), an ethoxylated wetting agent and molecular defoamer (e.g., SURFYNOL® 420 from Evonik Degussa), non-ionic wetting agents and molecular defoamers (e.g., SURFYNOL® 104E from Evonik Degussa), and/or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (organic surfactant) available from Evonik Degussa). Yet another suitable (anionic) surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the surface treating agent 14 may range from about 0.01 wt % active to about 3 wt % active based on the total weight of the surface treating agent 14. In an example, the total amount of surfactant(s) in the surface treating agent 14 may be about 1 wt % active based on the total weight of the surface treating agent 14.

Fusing Agents

The multi-fluid kit 10 and/or 3D printing kit 20 disclosed herein include one or more fusing agents 12. The fusing agents 12 include an electromagnetic radiation absorber, which absorb radiation and generate heat sufficient to coalesce/fuse the polyamide build material composition 22 in contact therewith during 3D printing.

An example of the fusing agent 12 is a core fusing agent 12A (see FIG. 3) and the electromagnetic radiation absorber has absorption at wavelengths ranging from 400 nm to 780 nm (e.g., in the visible region). As noted, this example of the fusing agent 12 is referred to as the core fusing agent 12A, or, in some instances, the black fusing agent. As described herein, the electromagnetic radiation absorber (also referred to as an energy absorber or active material) in the core fusing agent 12A may also absorb energy in the infrared region (e.g., 800 nm to 4000 nm). This absorption generates heat suitable for coalescing/fusing the polyamide build material composition 22 in contact therewith during 3D printing, which leads to 3D objects (or 3D objects regions) having mechanical integrity and relatively uniform mechanical properties (e.g., strength, elongation at break, etc.). This absorption, however, also results in strongly colored, e.g., black, 3D objects (or 3D objects regions).

Another example of the fusing agent 12 is a primer fusing agent 12B (see FIG. 3), and the electromagnetic radiation absorber is a plasmonic resonance absorber having absorption at wavelengths ranging from 800 nm to 4000 nm and having transparency at wavelengths ranging from 400 nm to 780 nm. As noted, this example of the fusing agent 12 is referred to as the primer fusing agent 12B, or, in some instances, the low tint fusing agent. This absorption and transparency allows the primer fusing agent 12B to absorb enough radiation to coalesce/fuse the build material composition in contact therewith, while enabling the 3D objects (or 3D objects regions) to be white or slightly colored.

Still other examples of the electromagnetic radiation absorber absorb some or all of the wavelengths within the range of 400 nm to 4000 nm. Examples include glass fibers, titanium dioxide, clay, mica, talc, barium sulfate, calcium carbonate, phosphate pigments, and/or silicate pigments. These energy absorbers are often white or lightly colored and may be used in either the core fusing agent 12A or the primer fusing agent 12B.

Phosphates may have a variety of counterions, such as copper, zinc, iron, magnesium, calcium, strontium, the like, and combinations thereof. Examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. Silicates can have the same or similar counterions as phosphates. Example silicates can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the phosphates and silicates described herein are not limited to counterions having a +2 oxidation state, and that other counterions can also be used to prepare other suitable near-infrared pigments.

As used herein "absorption" means that at least 80% of radiation having wavelengths within the specified range is absorbed. Also used herein, "transparency" means that 25% or less of radiation having wavelengths within the specified range is absorbed.

Core Fusinq Agent

Some examples of the core fusing agent 12A are dispersions including an electromagnetic radiation absorber. In some examples, the electromagnetic radiation absorber may be an infrared light absorbing colorant. In an example, the electromagnetic radiation absorber is a near-infrared light absorbing colorant. Any near-infrared colorants, e.g., those produced by Fabricolor, Eastman Kodak, or BASF, Yamamoto, may be used in the core fusing agent 12A. As one example, the core fusing agent 12A may be a printing liquid formulation including carbon black as the active material. Examples of this printing liquid formulation are commercially known as CM997A, 516458, C18928, C93848, C93808, or the like, all of which are available from HP Inc.

As another example, the core fusing agent 12A may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

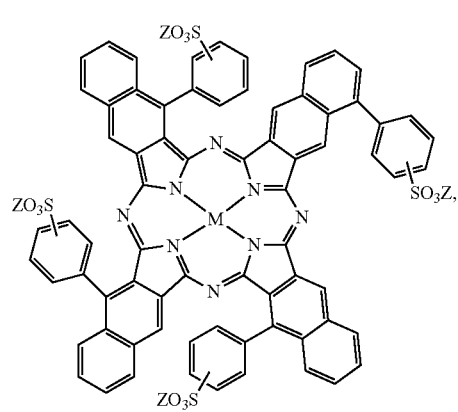
7
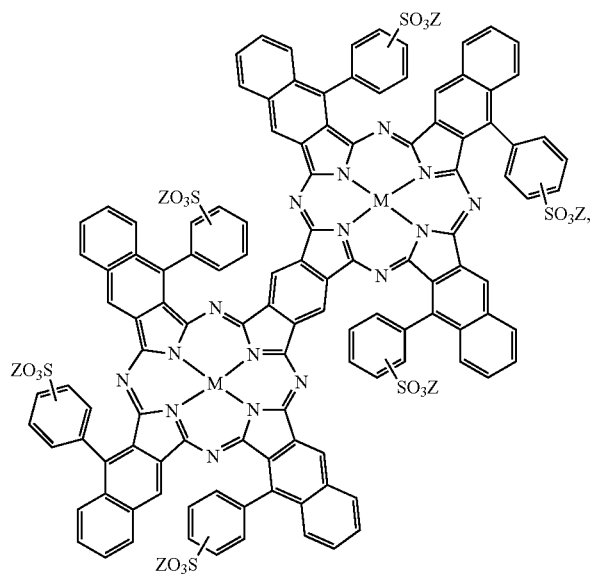
8
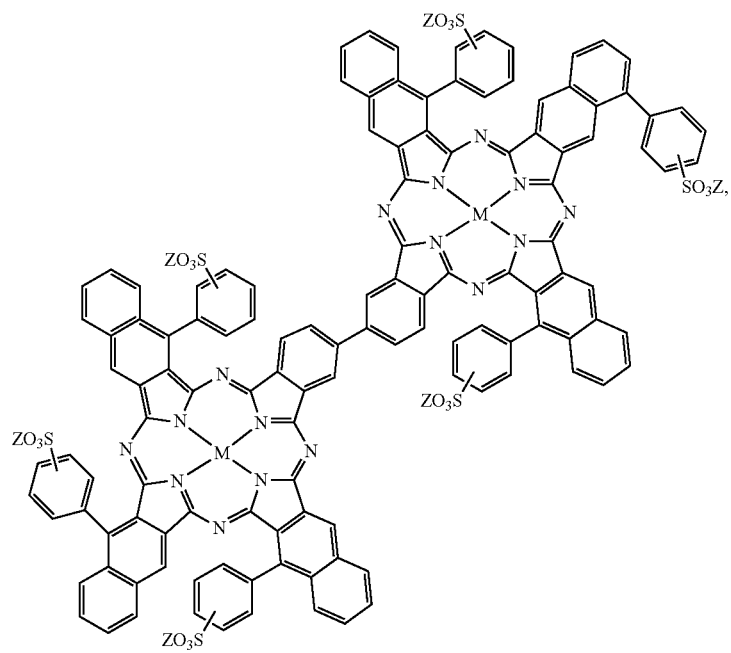

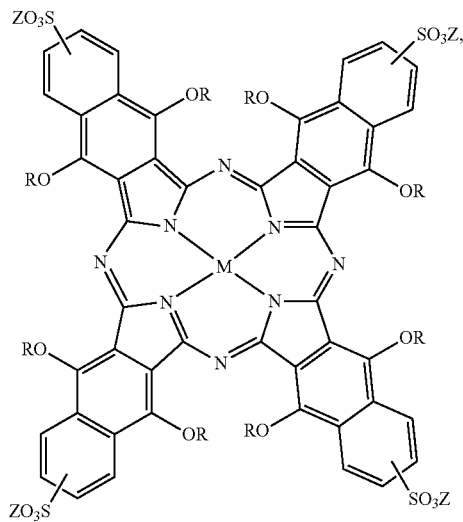

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

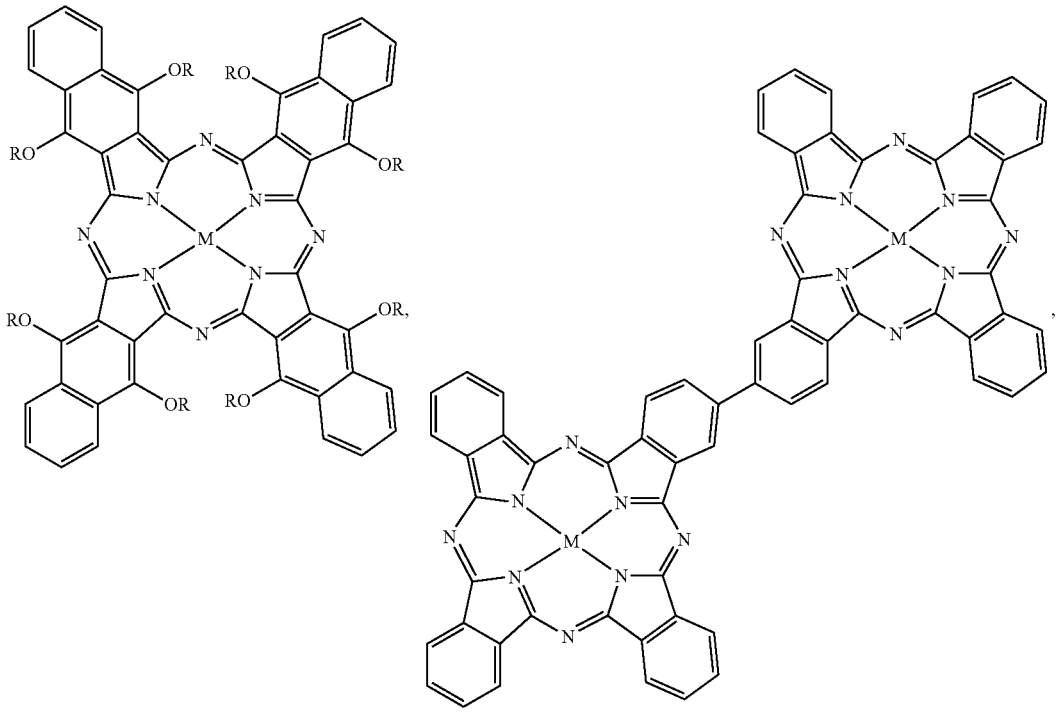

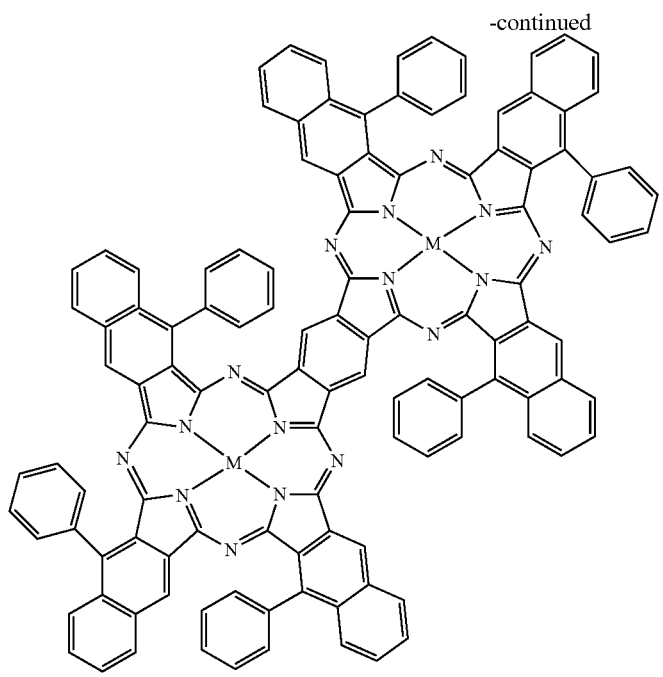

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used in the core fusing agent 12A. Some examples include anthraquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthraquinone dyes or pigments and metal (e.g., nickel) dithiolene dyes or pigments may have the following structures, respectively:

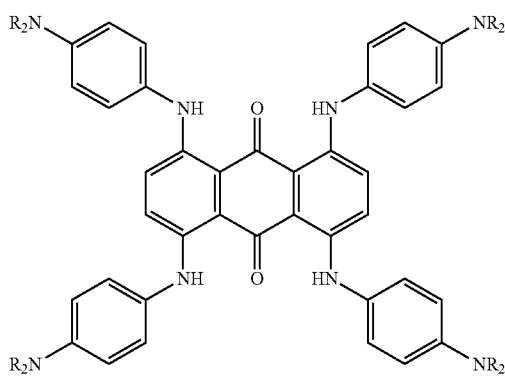

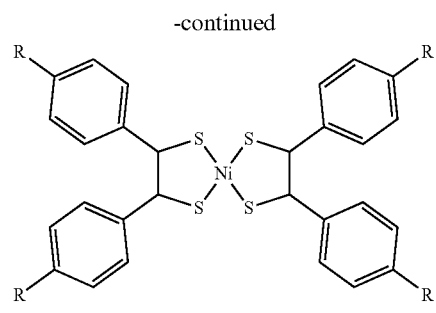

where R in the anthraquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

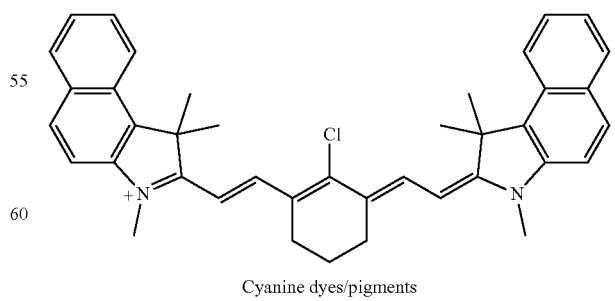

Cyanine dyes/pigments

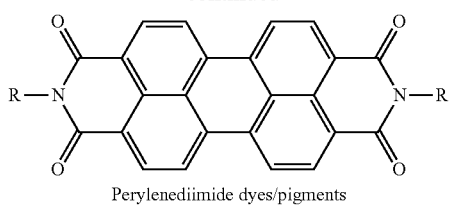

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

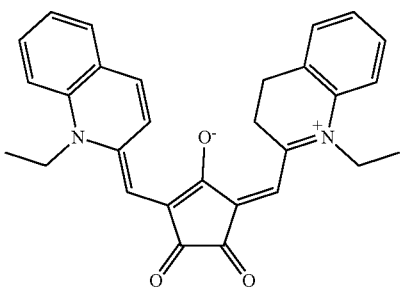

Croconium dyes/pigments

Pyrilium (X=O),
thiopyrilium (X=S)
dyes/pigments

Boron-dipyrromethene dyes or pigments and aza-boron-dipyrromethene dyes or pigments may have the following structures, respectively:

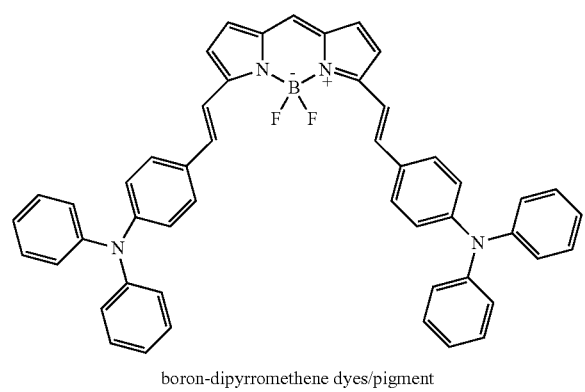

boron-dipyrromethene dyes/pigment

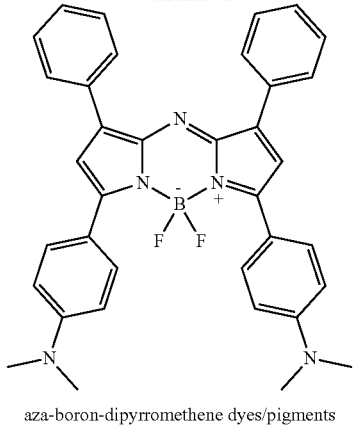

aza-boron-dipyrromethene dyes/pigments

Other suitable near-infrared absorbing dyes may include aminium dyes, tetraaryldiamine dyes, phthalocyanine dyes, and others.

Other near infrared absorbing materials include conjugated polymers (i.e., a polymer that has a backbone with alternating double and single bonds), such as poly(3,4-ethylenedioxythiophene)-poly(styrenesulfonate) (PEDOT: PSS), a polythiophene, poly(p-phenylene sulfide), a polyaniline, a poly(pyrrole), a poly(acetylene), poly(p-phenylene vinylene), polyparaphenylene, or combinations thereof.

The amount of the electromagnetic radiation absorber/energy absorber/active material that is present in the core fusing agent 12A ranges from greater than 0 wt % active to about 40 wt % active based on the total weight of the core fusing agent 12A. In other examples, the amount of the active material in the core fusing agent 12A ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these active material loadings provide a balance between the core fusing agent 12A having jetting reliability and heat and/or radiation absorbance efficiency.

Primer Fusing Agent

Some examples of the primer fusing agent 12B are dispersions including the electromagnetic radiation absorber that has absorption at wavelengths ranging from 800 nm to 4000 nm and transparency at wavelengths ranging from 400 nm to 780 nm. The absorption of this electromagnetic radiation absorber may be the result of plasmonic resonance effects. Electrons associated with the atoms of the electromagnetic radiation absorber may be collectively excited by radiation, which results in collective oscillation of the electrons. The wavelengths that can excite and oscillate these electrons collectively are dependent on the number of electrons present in the electromagnetic radiation absorber particles, which in turn is dependent on the size of the electromagnetic radiation absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the primer fusing agent 12B to be inkjet jettable as well as electromagnetically selective (e.g., having absorption at wavelengths ranging from 800 nm to 4000 nm and transparency at wavelengths ranging from 400 nm to 780 nm).

In an example, the electromagnetic radiation absorber of the primer fusing agent 12B has an average particle diameter (e.g., volume-weighted mean diameter) ranging from greater than 0 nm to less than 220 nm. In another example, the electromagnetic radiation absorber has an average particle diameter ranging from greater than 0 nm to 120 nm. In a still another example, the electromagnetic radiation absorber has an average particle diameter ranging from about 10 nm to about 200 nm.

In an example, the electromagnetic radiation absorber of the primer fusing agent 12B is an inorganic pigment. Examples of suitable inorganic pigments include lanthanum hexaboride ($LaB_6$), tungsten bronzes ($A_xWO_3$), indium tin oxide ($In_2O_3:SnO_2$, ITO), antimony tin oxide ($Sb_2O_3:SnO_2$, ATO), titanium nitride (TiN), aluminum zinc oxide (AZO), ruthenium oxide ($RuO_2$), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the electromagnetic radiation absorber that is present in the primer fusing agent 12B ranges from greater than 0 wt % active to about 40 wt % active based on the total weight of the primer fusing agent 12B. In other examples, the amount of the electromagnetic radiation absorber in the primer fusing agent 12B ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these electromagnetic radiation absorber loadings provide a balance between the primer fusing agent 12B having jetting reliability and heat and/or radiation absorbance efficiency.

The electromagnetic radiation absorber of the primer fusing agent 12B may, in some instances, be dispersed with a dispersant. As such, the dispersant helps to uniformly distribute the electromagnetic radiation absorber throughout the primer fusing agent 12B. Examples of suitable dispersants include polymer or small molecule dispersants, charged groups attached to the electromagnetic radiation absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the primer fusing agent 12B may range from about 10 wt % to about 200 wt % based on the weight of the electromagnetic radiation absorber in the primer fusing agent 12B.

A silane coupling agent may also be added to the primer fusing agent 12B to help bond the organic (e.g., dispersant) and inorganic (e.g., pigment) materials. Examples of suitable silane coupling agents include the SILQUEST® A series manufactured by Momentive.

Whether a single silane coupling agent is used or a combination of silane coupling agents is used, the total amount of silane coupling agent(s) in the primer fusing agent 12B may range from about 0.1 wt % to about 50 wt % based on the weight of the electromagnetic radiation absorber in the primer fusing agent 12B. In an example, the total amount of silane coupling agent(s) in the primer fusing agent 12B ranges from about 1 wt % to about 30 wt % based on the weight of the electromagnetic radiation absorber. In another example, the total amount of silane coupling agent(s) in the primer fusing agent 12B ranges from about 2.5 wt % to about 25 wt % based on the weight of the electromagnetic radiation absorber.

One example of the primer fusing agent 12B includes cesium tungsten oxide (CTO) nanoparticles as the electromagnetic radiation absorber. The CTO nanoparticles have a formula of $Cs_xWO_3$, where 0<x<1. The cesium tungsten oxide nanoparticles may give the primer fusing agent 12B a light blue color. The strength of the color may depend, at least in part, on the amount of the CTO nanoparticles in the primer fusing agent 12B. When it is desirable to form an outer white layer on the 3D object, less of the CTO nanoparticles may be used in the primer fusing agent 12B in order to achieve the white color. In an example, the CTO nanoparticles may be present in the primer fusing agent 12B in an amount ranging from about 1 wt % to about 20 wt % (based on the total weight of the primer fusing agent 12B).

The average particle size of the CTO nanoparticles may range from about 1 nm to about 40 nm. The term "average particle size", as used herein, may refer to a number-weighted mean diameter or a volume-weighted mean diameter of a particle distribution. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the primer fusing agent 12B may also include a zwitterionic stabilizer. The zwitterionic stabilizer may improve the stabilization of this example of the primer fusing agent 12B. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the primer fusing agent 12B.

Examples of suitable zwitterionic stabilizers include $C_2$ to $C_8$ betaines, $C_2$ to $C_8$ aminocarboxylic acids having a solubility of at least 10 g in 100 g of water, taurine, and combinations thereof. Examples of the $C_2$ to $C_8$ aminocarboxylic acids include beta-alanine, gamma-aminobutyric acid, glycine, and combinations thereof.

The zwitterionic stabilizer may be present in the primer fusing agent 12B in an amount ranging from about 2 wt % to about 35 wt % (based on the total weight of the primer fusing agent 12B). When the zwitterionic stabilizer is the $C_2$ to $C_8$ betaine, the $C_2$ to $C_8$ betaine may be present in an amount ranging from about 8 wt % to about 35 wt % of the total weight of the primer fusing agent 12B. When the zwitterionic stabilizer is the $C_2$ to $C_8$ aminocarboxylic acid, the $C_2$ to $C_8$ aminocarboxylic acid may be present in an amount ranging from about 2 wt % to about 20 wt % of the total weight of the primer fusing agent 12B. When the zwitterionic stabilizer is taurine, taurine may be present in an amount ranging from about 2 wt % to about 35 wt % of the total weight of the primer fusing agent 12B.

In this example, the weight ratio of the CTO nanoparticles to the zwitterionic stabilizer may range from 1:10 to 10:1; or the weight ratio of the CTO nanoparticles to the zwitterionic stabilizer may be 1:1.

Vehicle for Fusing Agents

Any example of the fusing agent (core or primer fusing agent 12A, 12B) includes a liquid vehicle. The fusing agent vehicle, or "FA vehicle," may refer to the liquid in which the electromagnetic radiation absorber is/are dispersed or dissolved to form the respective fusing agent 12A, 12B. A wide variety of FA vehicles, including aqueous vehicles, may be used in the fusing agents 12A, 12B. In some examples, the FA vehicle may include water alone or water and a non-aqueous solvent with no other components. In other examples, the FA vehicle may include other components, depending, in part, upon the applicator that is to be used to dispense the fusing agent 12. Examples of other suitable fusing agent components include co-solvent(s), humectant(s), surfactant(s), antimicrobial agent(s), anti-kogation agent(s), and/or chelating agent(s).

Classes of water soluble or water miscible organic co-solvents that may be used in the fusing agents include aliphatic alcohols, aromatic alcohols, diols, glycol ethers, polyglycol ethers, lactams, formamides (substituted and unsubstituted), acetamides (substituted and unsubstituted), glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,2-propanediol, 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, 1-(2-hydroxyethyl)-2-pyrrolidone, and the like. Other examples of organic co-solvents include dimethyl sulfoxide (DMSO), isopropyl alcohol, ethanol, pentanol, acetone, or the like.

The co-solvent(s) may be present in the fusing agent 12 in a total amount ranging from about 1 wt % to about 20 wt % based upon the total weight of the fusing agent 12. In an example, the fusing agent 12 includes from about 2 wt % to about 15 wt %, or from about 5 wt % to about 10 wt % of the co-solvent(s).

The FA vehicle may also include humectant(s). An example of a suitable humectant is ethoxylated glycerin having the following formula:

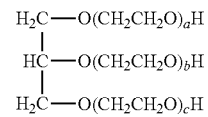

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In an example, the total amount of the humectant(s) present in the fusing agent 12 ranges from about 3 wt % active to about 10 wt % active, based on the total weight of the fusing agent 12.

It is to be understood that any of the surfactant(s) described herein for the surface treating agent 14 may be used in any examples of the fusing agent 12 in any of the amounts provided, except that the percentages will be with respect to the total weight of the fusing agent.

The FA vehicle may also include antimicrobial agent(s). Antimicrobial agents are also known as biocides and/or fungicides. Examples of suitable antimicrobial agents include the NUOSEPT® (Ashland Inc.), UCARCIDE™ or KORDEK™ or ROCIMA™ (The Dow Chemical Company), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (The Dow Chemical Company), and combinations thereof.

In an example, the total amount of antimicrobial agent(s) in the fusing agent 12 ranges from about 0.01 wt % active to about 0.05 wt % active (based on the total weight of the fusing agent 12). In another example, the total amount of antimicrobial agent(s) in the fusing agent 12 is about 0.04 wt % active (based on the total weight of the fusing agent 12).

The FA vehicle may also include anti-kogation agent(s) that is/are to be jetted using thermal inkjet printing. Kogation refers to the deposit of dried printing liquid (e.g., fusing agent) on a heating element of a thermal inkjet printhead. Anti-kogation agent(s) is/are included to assist in preventing the buildup of kogation.

Examples of suitable anti-kogation agents include oleth-3-phosphate (commercially available as CRODAFOS™ O3A or CRODAFOS™ N-3A) or dextran 500 k. Other suitable examples of the anti-kogation agents include CRODAFOS™ HCE (phosphate-ester from Croda Int.), CRODAFOS® O10A (oleth-10-phosphate from Croda Int.), or DISPERSOGEN® LFH (polymeric dispersing agent with aromatic anchoring groups, acid form, anionic, from Clariant), etc. It is to be understood that any combination of the anti-kogation agents listed may be used.

The anti-kogation agent may be present in the fusing agent 12 in an amount ranging from about 0.1 wt % active to about 1.5 wt % active, based on the total weight of the fusing agent 12. In an example, the anti-kogation agent is present in an amount of about 0.5 wt % active, based on the total weight of the fusing agent 12.

Chelating agents (or sequestering agents) may be included in the aqueous liquid vehicle of the fusing agent 12 to eliminate the deleterious effects of heavy metal impurities. In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof. Methylglycinediacetic acid, trisodium salt (Na3MGDA) is commercially available as TRILON® M from BASF Corp. 4,5-dihydroxy-1,3-benzenedisulfonic acid disodium salt monohydrate is commercially available as TIRON™ monohydrate. Hexamethylenediamine tetra(methylene phosphonic acid), potassium salt is commercially available as DEQUEST® 2054 from Italmatch Chemicals.

Whether a single chelating agent is used or a combination of chelating agents is used, the total amount of chelating agent(s) in the fusing agent 12 may range from greater than 0 wt % active to about 0.5 wt % active based on the total weight of the fusing agent 12. In an example, the chelating agent is present in an amount ranging from about 0.05 wt % active to about 0.2 wt % active based on the total weight of fusing agent 12. In another example, the chelating agent(s) is/are present in the fusing agent 12 in an amount of about 0.05 wt % active (based on the total weight of the fusing agent 12).

The balance of the fusing agent(s) 12 is water (e.g., deionized water, purified water, etc.), which as described herein, may vary depending upon the other components in the fusing agent(s) 12.

Detailing Agent

Some examples of the multi-fluid kit 10 and/or 3D printing kit 10 include the detailing agent 16. The detailing agent 16 may include a surfactant, a co-solvent, and a balance of water. In some examples, the detailing agent 16 consists of these components, and no other components. In some other examples, the detailing agent 16 may further include a colorant. In still some other examples, the detailing agent 16 consists of a colorant, a surfactant, a co-solvent, and a balance of water, with no other components. In yet some other examples, the detailing agent 16 may further include additional components, such as anti-kogation agent(s), antimicrobial agent(s), and/or chelating agent(s) (each of which is described above in reference to the fusing agent 12).

The surfactant(s) that may be used in the detailing agent 16 include any of the surfactants listed herein in reference to the surface treating agent 14. The total amount of surfactant(s) in the detailing agent 16 may range from about 0.10 wt % to about 5.00 wt % with respect to the total weight of the detailing agent 16.

The co-solvent(s) that may be used in the detailing agent 16 include any of the co-solvents listed above in reference to the fusing agent 12. The total amount of co-solvent(s) in the detailing agent 16 may range from about 1 wt % to about 65 wt % with respect to the total weight of the detailing agent 16.

In some examples, the detailing agent 16 does not include a colorant. In these examples, the detailing agent 16 may be colorless. As used herein, "colorless," means that the detailing agent 16 is achromatic and does not include a colorant.

When the detailing agent 16 includes the colorant, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye may also be capable of absorbing radiation with wavelengths of 650 nm or less. As such, the dye absorbs at least some wavelengths within the visible spectrum, but absorbs little or no wavelengths within the near-infrared spectrum. This is in contrast to the active (energy absorbing) material in the fusing agent 12, which absorbs wavelengths within the near-infrared spectrum. As such, the colorant in the detailing agent 16 will not substantially absorb the fusing radiation, and thus will not initiate melting and fusing (coalescence) of the polyamide build material composition 22 in contact therewith when the build material layer is exposed to the energy.

It may be desirable to add color to the detailing agent 16 when the detailing agent 16 is applied to the edge of a colored part. Color in the detailing agent 16 may be desirable when used at a part edge because some of the colorant may become embedded in the polyamide build material composition 22 that fuses/coalesces at the edge. As such, in some examples, the dye in the detailing agent 16 may be selected so that its color matches the color of the active material in the fusing agent 12. As examples, the dye may be any azo dye having sodium or potassium counter ion(s) or any diazo (i.e., double azo) dye having sodium or potassium counter ion(s), where the color of azo or dye azo dye matches the color of the fusing agent.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

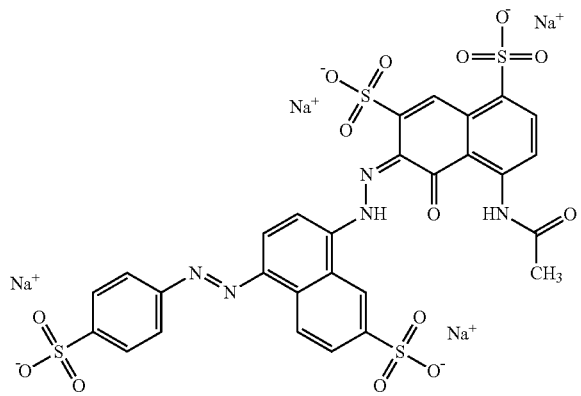 [SMILES: [Na+] ; CC(=O)Nc1ccc(S(=O)(=O)O)c2c1C(=O)/C(=N\Nc1ccc(/N=N/c3ccc(S(=O)(=O)O)cc3)c3ccc(S(=O)(=O)O)cc13)C(S(=O)(=O)O)=C2 ; [Na+] ; [Na+] ; [Na+]]

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

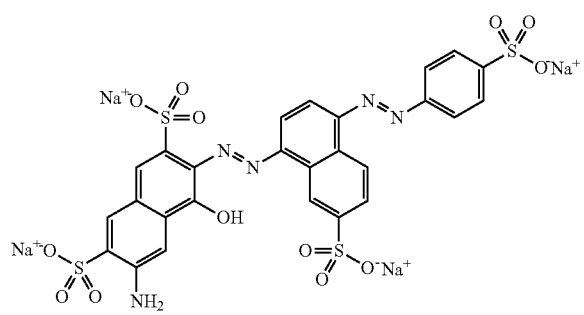 [SMILES: [Na+] ; Nc1cc2c(O)c(/N=N/c3ccc(/N=N/c4ccc(S(=O)(=O)O)cc4)c4ccc(S(=O)(=O)O)cc34)c(S(=O)(=O)O)cc2cc1S(=O)(=O)O ; [Na+] ; [Na+] ; [Na+]]

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

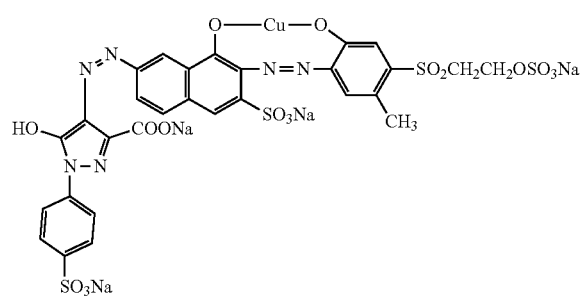

(commercially available as Reactive Black 31); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

and combinations thereof. Some other commercially available examples of the dye used in the detailing agent include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent 16 may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D object.

Some examples of the other dye include a salt, such as a sodium salt, an ammonium salt, or a potassium salt. Some specific examples include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

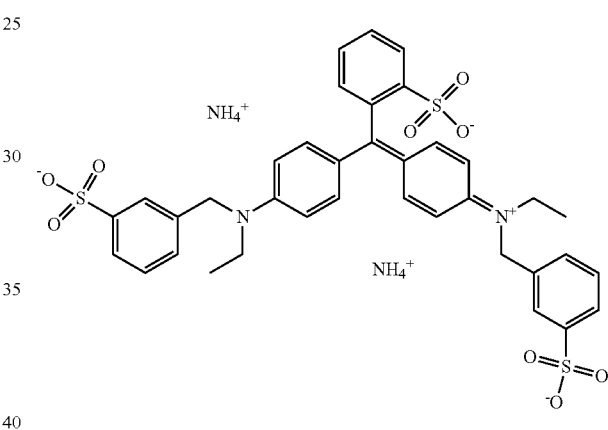

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

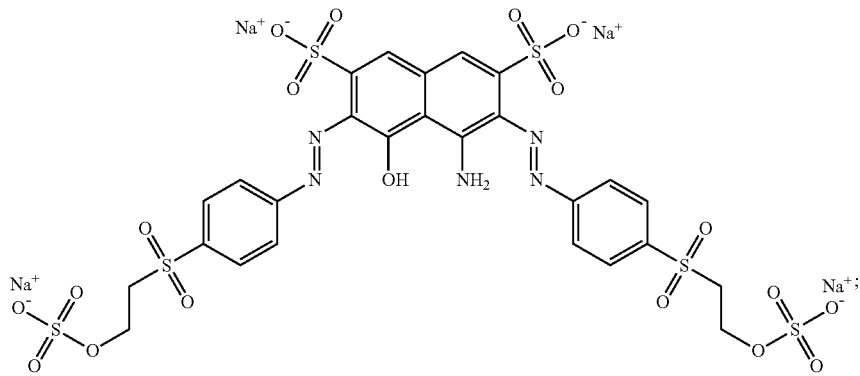 [SMILES: [Na+] ; Nc1c(/N=N/c2ccc(S(=O)(=O)CCOS(=O)(=O)O)cc2)c(S(=O)(=O)O)cc2cc(S(=O)(=O)O)c(/N=N/c3ccc(S(=O)(=O)CCOS(=O)(=O)O)cc3)c(O)c12 ; [Na+] ; [Na+] ; [Na+]]

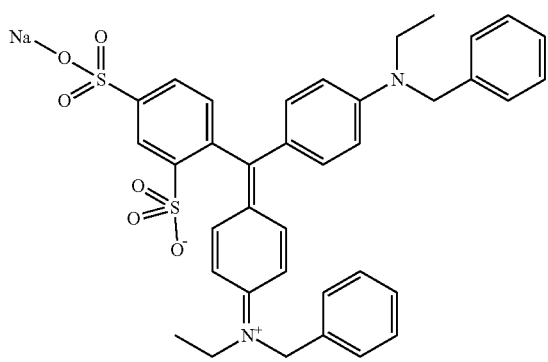

(commercially available as Acid Blue 7); and a phthalocyanine with a chemical structure of:

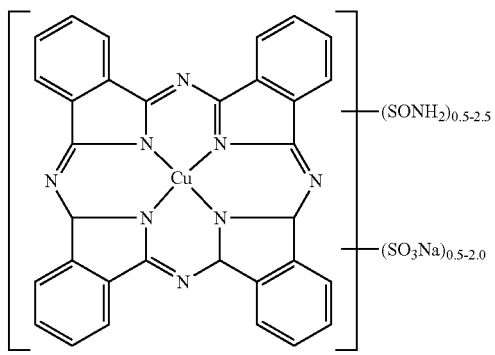

(commercially available as Direct Blue 199); and combinations thereof.

In an example of the detailing agent 16, the dye may be present in an amount ranging from about 1 wt % to about 3 wt % based on the total weight of the detailing agent 16. In another example of the detailing agent 16 including a combination of dyes, one dye (e.g., the black dye) is present in an amount ranging from about 1.50 wt % to about 1.75 wt % based on the total weight of the detailing agent 16, and the other dye (e.g., the cyan dye) is present in an amount ranging from about 0.25 wt % to about 0.50 wt % based on the total weight of the detailing agent 16.

The balance of the detailing agent 16 is water. As such, the amount of water may vary depending upon the amounts of the other components that are included.

Coloring Agent

Some examples of the multi-fluid kit 10 and/or 3D printing kit 20 include a coloring agent 18. The coloring agent 18 may include a colorant, a co-solvent, and a balance of water. In some examples, the coloring agent 18 consists of these components, and no other components.

In some other examples, the coloring agent 18 may further include a binder and/or a buffer. The binder may be an acrylic latex binder, which may be a copolymer of any two or more of styrene, acrylic acid, methacrylic acid, methyl methacrylate, ethyl methacrylate, and butyl methacrylate. The buffer may be TRIS (tris(hydroxymethyl)aminomethane or TRIZMA®), TRIS or TRIZMA® hydrochloride, bis-tris propane, TES (2-[(2-Hydroxy-1,1-bis(hydroxymethyl)ethyl)amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO (β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris(Hydroxymethyl)methyl-4-aminobutanesulfonic acid), or the like.

In still other examples, the coloring agent 18 may further include additional components, such as dispersant(s), humectant(s), surfactant(s), anti-kogation agent(s), antimicrobial agent(s), and/or chelating agent(s) (each of which is described herein in reference to the surface treating agent 14 and/or fusing agents 12).

The coloring agent 18 may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

In some instances, the colorant of the coloring agent 18 may be transparent to infrared wavelengths. In other instances, the colorant of the coloring agent 18 may not be completely transparent to infrared wavelengths, but does not absorb enough radiation to sufficiently heat the polyamide build material composition 22 in contact therewith. In an example, the colorant absorbs less than 10% of radiation having wavelengths in a range of 650 nm to 2500 nm. In another example, the colorant absorbs less than 20% of radiation having wavelengths in a range of 650 nm to 4000 nm.

The colorant of the coloring agent 18 is also capable of absorbing radiation with wavelengths of 650 nm or less. As such, the colorant absorbs at least some wavelengths within the visible spectrum, but absorbs little or no wavelengths within the near-infrared spectrum. This is in contrast to at least some examples of the electromagnetic radiation absorber in the fusing agent 12, which absorbs wavelengths within the near-infrared spectrum and/or the infrared spectrum. As such, the colorant in the coloring agent 18 will not substantially absorb the fusing radiation, and thus will not initiate coalescing/fusing of the polyamide build material composition 22 in contact therewith when the polyamide build material composition 22 is exposed to energy.

Examples of IR transparent colorants include acid yellow 23 (AY 23), AY17, acid red 52 (AR 52), AR 289, and reactive red 180 (RR 180). Examples of colorants that absorb some visible wavelengths and some IR wavelengths include cyan colorants, such as direct blue 199 (DB 199) and pigment blue 15:3 (PB 15:3).

In other examples, the colorant may be any azo dye having sodium or potassium counter ion(s) or any diazo (i.e., double azo) dye having sodium or potassium counter ion(s), such as those described herein for the detailing agent 16.

An example of the pigment based coloring agent 18 may include from about 1 wt % to about 10 wt % of pigment(s), from about 10 wt % to about 30 wt % of co-solvent(s), from about 1 wt % to about 10 wt % of dispersant(s), from about 0.1 wt % to about 5 wt % of binder(s), from 0.01 wt % to about 1 wt % of anti-kogation agent(s), from about 0.05 wt % to about 0.1 wt % antimicrobial agent(s), and a balance of water. An example of the dye based coloring agent 18 may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Some examples of the coloring agent 18 include a set of cyan, magenta, and yellow agents, such as C1893A (cyan), C1984A (magenta), and C1985A (yellow); or C4801A (cyan), C4802A (magenta), and C4803A (yellow); all of which are available from HP Inc. Other commercially available coloring agents 18 include C9384A (printhead HP 72), C9383A (printhead HP 72), C4901A (printhead HP 940), and C4900A (printhead HP 940).

Polyamide Build Material Composition

The polyamide build material composition 22 includes polyamide particles. Examples of suitable polyamides include polyamide-11 (PA 11/nylon 11), polyamide-12 (PA 12/nylon 12), polyamide-6 (PA 6/nylon 6), polyamide-8 (PA 8/nylon 8), polyamide-9 (PA 9/nylon 9), polyamide-66 (PA 66/nylon 66), polyamide-612 (PA 612/nylon 612), polyamide-812 (PA 812/nylon 812), polyamide-912 (PA 912/nylon 912), etc.), a thermoplastic polyamide (TPA), and combinations thereof.

In some examples, the polyamide particles may be in the form of a powder or a powder-like material. The powder-like material includes, for example, short fibers having a length that is greater than its width. In some examples, the powder or powder-like material may be formed from, or may include, short fibers that may, for example, have been cut into short lengths from long strands or threads of material.

The polyamide particles may be made up of similarly sized particles and/or differently sized particles. In an example, the average particle size (e.g., volume-weighted mean diameter of a particle distribution) of the polyamide particles ranges from about 2 µm to about 225 µm. In another example, the average particle size of the polyamide particles ranges from about 10 µm to about 130 µm.

When the polyamide build material composition 22 includes crystalline or semi-crystalline polyamide particles, the polyamide build material composition 22 may have a wide processing window of greater than 5° C., which can be defined by the temperature range between the melting point and the re-crystallization temperature. In an example, the polyamide build material composition 22 may have a melting point ranging from about 50° C. to about 300° C. As other examples, the polyamide build material composition 22 may have a melting point ranging from about 155° C. to about 225° C., from about 155° C. to about 215° C., about 160° C. to about 200° C., from about 170° C. to about 190° C., or from about 182° C. to about 189° C. As still another example, the polyamide build material composition 22 may have a melting point of about 180° C.

When the polyamide build material composition 22 includes thermoplastic polyamide particles, the polyamide build material composition 22 may have a melting range within the range of from about 130° C. to about 250° C.

In some examples, the polyamide build material composition 22 does not substantially absorb radiation having a wavelength within the range of 300 nm to 1400 nm. The phrase "does not substantially absorb" means that the absorptivity of the polyamide build material composition 22 at a particular wavelength is 25% or less (e.g., 20%, 10%, 5%, etc.)

In some examples, in addition to the polyamide particles, the polyamide build material composition 22 may include an antioxidant, a whitener, an antistatic agent, a flow aid, or a combination thereof. While several examples of these additives are provided, it is to be understood that these additives are selected to be thermally stable (i.e., will not decompose) at the 3D printing temperatures.

Antioxidant(s) may be added to the polyamide build material composition 22 to prevent or slow molecular weight decreases of the polyamide particles and/or to prevent or slow discoloration (e.g., yellowing) by preventing or slowing oxidation of the polyamide particles. In some examples, the polyamide particles may discolor upon reacting with oxygen, and this discoloration may contribute to the discoloration of the polyamide build material composition 22. The antioxidant may be selected to minimize discoloration. In some examples, the antioxidant may be a radical scavenger. In these examples, the antioxidant may include IRGANOX®1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 µm or less) that are dry blended with the polyamide particles. In an example, the antioxidant may be included in the polyamide build material composition 22 in an amount ranging from about 0.01 wt % to about 5 wt %, based on the total weight of the polyamide build material composition 22. In other examples, the antioxidant may be included in the polyamide build material composition 22 in an amount ranging from about 0.01 wt % to about 2 wt % or from about 0.2 wt % to about 1 wt %, based on the total weight of the polyamide build material composition 22.

Whitener(s) may be added to the polyamide build material composition 22 to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the polyamide build material composition 22 in an amount ranging from greater than 0 wt % to about 10 wt %, based on the total weight of the polyamide build material composition 22.

Antistatic agent(s) may be added to the polyamide build material composition 22 to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the polyamide build material composition 22.

Flow aid(s) may be added to improve the coating flowability of the polyamide build material composition 22.

Flow aids may be particularly beneficial when the polyamide build material composition 22 has an average particle size less than 25 μm. The flow aid improves the flowability of the build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the polyamide build material composition 22.

Printing Methods and Methods of Use

Different examples of the 3D printing method are shown and described in reference to FIG. 2 through FIG. 8.

Prior to execution of any examples of the method, it is to be understood that a controller may access data stored in a data store pertaining to a 3D part/object that is to be printed. For example, the controller may determine the number of layers of the polyamide build material composition 22 that are to be formed, the locations at which any of the agents is/are to be deposited on each of the respective layers, etc.

Printing with the Surface Treating Agent and One Fusing Agent

Figure 2:
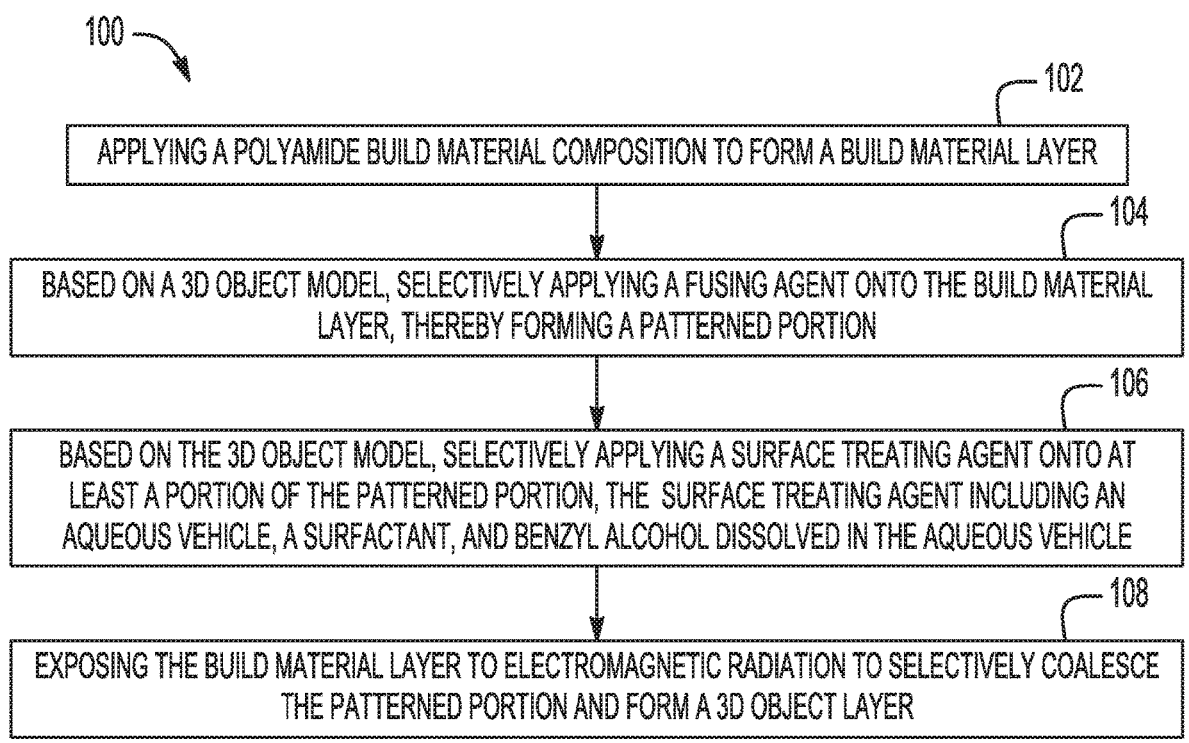
FIG. 2 is a flow diagram depicting an example of a 3D printing method.
Figure 3:
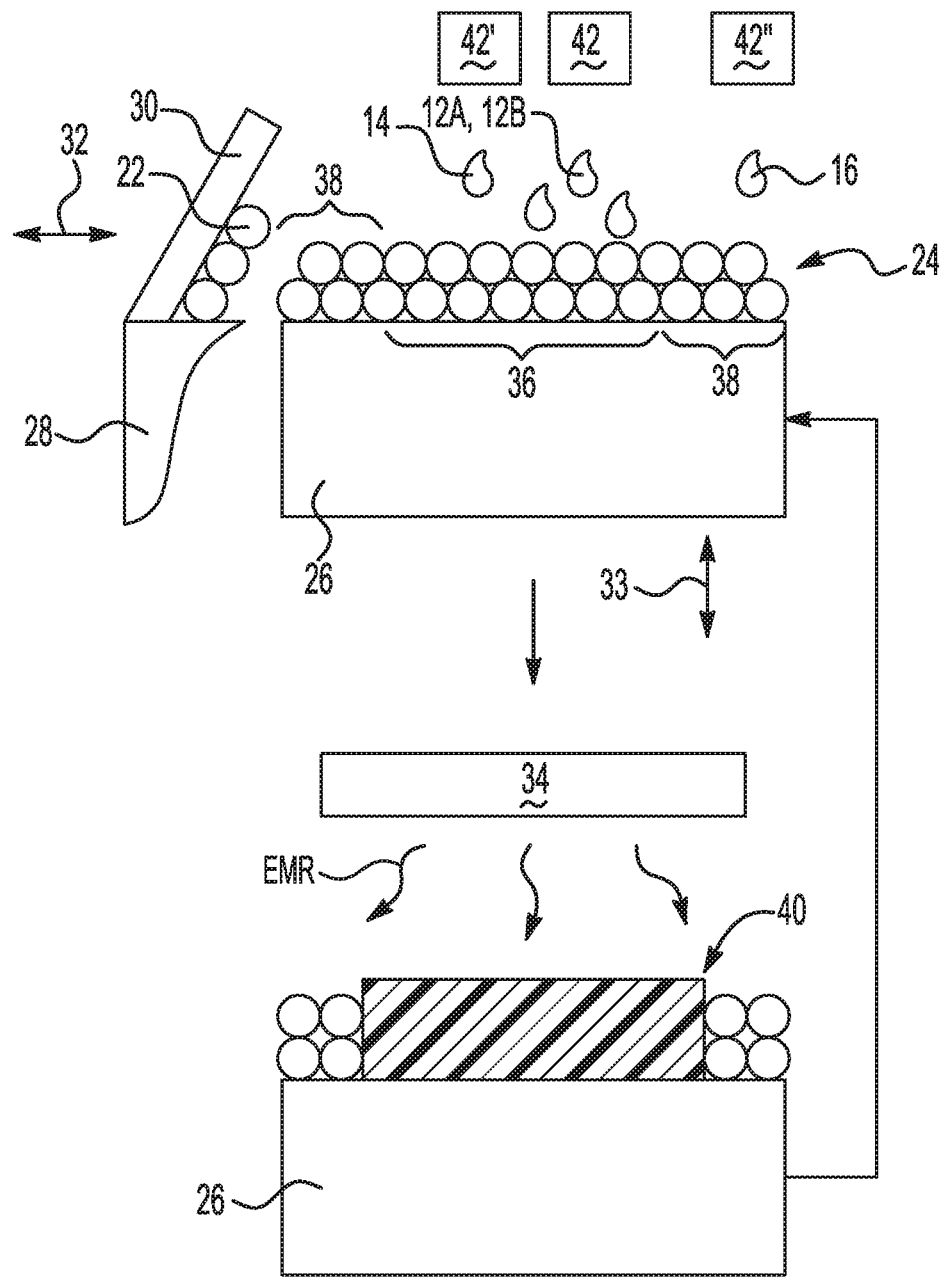
FIG. 3 is a schematic illustration of one example of the 3D printing method of FIG. 2.

Referring now to FIG. 2 and FIG. 3, an example of the method 100 which utilizes the surface treating agent 14 and one of the fusing agents 12A or 12B is depicted.

The method 100 shown in FIG. 2 includes applying a polyamide build material composition to form a build material layer (reference numeral 102); based on a 3D object model, selectively applying a fusing agent onto the build material layer, thereby forming a patterned portion (reference numeral 104); based on the 3D object model, selectively applying a surface treating agent onto at least a portion of the patterned portion, the surface treating agent including an aqueous vehicle, a surfactant, and benzyl alcohol dissolved in the aqueous vehicle (reference numeral 106); and exposing the build material layer to electromagnetic radiation to selectively coalesce the patterned portion and form a 3D object layer (reference numeral 108).

The method 100 is shown schematically in FIG. 3. In FIG. 3, a layer 24 of the polyamide build material composition 22 is applied on a build area platform 26. A printing system may be used to apply the polyamide build material composition 22. The printing system may include the build area platform 26, a build material supply 28 containing the build material composition 22, and a build material distributor 30.

The build area platform 26 receives the polyamide build material composition 22 from the build material supply 28. The build area platform 26 may be moved in the directions as denoted by the arrow 33, e.g., along the z-axis, so that the build material composition 22 may be delivered to the build area platform 26 or to a previously formed layer. In an example, when the polyamide build material composition 22 is to be delivered, the build area platform 26 may be programmed to advance (e.g., downward) enough so that the build material distributor 30 can push the build material composition 22 onto the build area platform 26 to form a substantially uniform layer 24 of the build material composition 22 thereon. The build area platform 26 may also be returned to its original position, for example, when a new part is to be built.

The build material supply 28 may be a container, bed, or other surface that is to position the build material composition 22 between the build material distributor 30 and the build area platform 26. The build material supply 28 may include heaters so that the build material composition 22 is heated to a supply temperature ranging from about 25° C. to about 150° C. In these examples, the supply temperature may depend, in part, on the build material composition 22 used and/or the 3D printer used. As such, the range provided is one example, and higher or lower temperatures may be used.

The build material distributor 30 may be moved in the directions as denoted by the arrow 32, e.g., along the y-axis, over the build material supply 28 and across the build area platform 26 to spread the layer 24 of the polyamide build material composition 22 over the build area platform 26. The build material distributor 30 may also be returned to a position adjacent to the build material supply 28 following the spreading of the polyamide build material composition 22. The build material distributor 30 may be a blade (e.g., a doctor blade), a roller, a combination of a roller and a blade, and/or any other device capable of spreading the build material composition 22 over the build area platform 26. For instance, the build material distributor 30 may be a counter-rotating roller. In some examples, the build material supply 28 or a portion of the build material supply 28 may translate along with the build material distributor 30 such that polyamide build material composition 22 is delivered continuously to the build area platform 26 rather than being supplied from a single location at the side of the printing system as depicted in FIG. 3.

The build material supply 28 may supply the polyamide build material composition 22 into a position so that it is ready to be spread onto the build area platform 26. The build material distributor 30 may spread the supplied build material composition 22 onto the build area platform 26. The controller (not shown) may process "control build material supply" data, and in response, control the build material supply 28 to appropriately position the particles of the build material composition 22, and may process "control spreader" data, and in response, control the build material distributor 30 to spread the polyamide build material composition 22 over the build area platform 26 to form the layer 24. In FIG. 3, one build material layer 24 has been formed.

The layer 24 has a substantially uniform thickness across the build area platform 26. In an example, the build material layer 24 has a thickness ranging from about 50 μm to about 120 μm. In another example, the thickness of the build material layer 24 ranges from about 30 μm to about 300 μm. It is to be understood that thinner or thicker layers may also be used. For example, the thickness of the build material layer 24 may range from about 20 μm to about 500 μm. The layer thickness may be about 2× (i.e., 2 times) the average diameter of the polyamide particles at a minimum for finer part definition. In some examples, the layer thickness may be about 1.2× the average diameter of the polyamide particles in the polyamide build material composition 22.

After the polyamide build material composition 22 has been applied, and prior to further processing, the build material layer 24 may be exposed to heating. In an example, the heating temperature may be below the melting point or melting range of the polyamide material in the build material composition 22. As examples, the pre-heating temperature may range from about 5° C. to about 50° C. below the melting point or the lowest temperature of the melting range of the polyamide material. In an example, the pre-heating temperature ranges from about 50° C. to about 205° C. In still another example, the pre-heating temperature ranges from about 100° C. to about 190° C. It is to be understood that the pre-heating temperature may depend, in part, on the build material composition 22 used. As such, the ranges provided are some examples, and higher or lower temperatures may be used.

Pre-heating the layer 24 may be accomplished by using any suitable heat source that exposes all of the polyamide build material composition 22 in the layer 24 to the heat. Examples of the heat source include a thermal heat source (e.g., a heater (not shown) integrated into the build area platform 26 (which may include sidewalls)) or a radiation source 34.

After the layer 24 is formed, and in some instances is pre-heated, the fusing agent 12A or 12B is selectively applied on at least some of the polyamide build material composition 22 in the layer 24 to form a patterned portion 36.

To form a layer 40 of a 3D object, at least a portion (e.g., patterned portion 36) of the layer 24 of the build material composition 22 is patterned with the fusing agent 12A or 12B. Either fusing agent 12A or 12B may be used. When it is desirable to form a white, colored, or slightly tinted object layer 40, the primer fusing agent 12B may be used to pattern the polyamide build material composition 22. The primer fusing agent 12B is clear or slightly tinted, and thus the resulting 3D object layer 40 may appear white or the color of the build material composition 22. When it is desirable to form a darker color or black object layer 40, the core fusing agent 12A may be used. The core fusing agent 12A is dark or black, and thus the resulting 3D object layer 40 may appear grey, black or another dark color. In other examples of the method (e.g., method 200 shown in FIG. 4 and FIG. 5) the two fusing agents 12A and 12B may be used to pattern different portions of a single build material layer 24, which will be described further in reference to FIG. 4 and FIG. 5. Color may also be added by using the coloring agent (not shown), which will also be described further in reference to FIG. 8.

The volume of the fusing agent 12A or 12B that is applied per unit of the polyamide build material composition 22 in the patterned portion 36 may be sufficient to absorb and convert enough electromagnetic radiation so that the polyamide build material composition 22 in the patterned portion 36 will coalesce/fuse. The volume of the fusing agent 12A or 12B that is applied per unit of the polyamide build material composition 22 may depend, at least in part, on the electromagnetic radiation absorber used, the electromagnetic radiation absorber loading in the fusing agent 12A or 12B, and the polyamide material in the build material composition 22.

To solubilize at least a portion of the layer 40 of the 3D object, and thus improve coalescence and surface roughness, corresponding portion(s) 37 of the patterned portion 36 is/are also patterned with the surface treating agent 14. The surface treating agent 14 may be applied in accordance with the 3D object model wherever it is desirable for the final 3D object layer 40 to exhibit reduced surface roughness. Utilizing a surface treating agent 14 that is separate from the fusing agent 12A or 12B enables 3D objects with tailored higher solubility areas to be formed. For example, the surface treating agent 14 may not be applied to interior portion(s) of the layer 24 so the resulting part of the 3D object remains strong and relatively insoluble, and the surface treating agent 14 may be applied to the outermost portion(s) of the layer 24 so the resulting part of the 3D object is modified to exhibit increased solubility, coalescence and smoothness. In an example, the surface roughness of the outermost layer is 3 µm or less. In the example shown in FIG. 3, the 3D object layer 40 is an outermost layer, and thus forms one surface of the 3D object. The surface treating agent 14 is applied to the entire patterned portion 36 to impart reduced surface roughness to this surface of the 3D object layer 40.

The volume of the surface treating agent 14 that is applied per unit of the polyamide build material composition 22 in the portion 36 may depend upon whether it is desirable to impart solubility at the voxel surface and/or through the voxel volume, upon the volume of polyamide build material composition 22 in the layer 24, and the volume of the fusing agent 12A or 12B that is applied.

The surface treating agent 14 can provide a cooling effect (which may be less than the effect brought on by the detailing agent 16), and thus the ratio of surface treating agent 14 to fusing agent 12A or 12B is controlled in order to achieve both fusing and a desired level of smoothness. In an example, a weight ratio of the benzyl alcohol in the selectively applied surface treating agent 14 to an electromagnetic radiation absorber in the selectively applied fusing agent 12A or 12B ranges from about 0.1 to about 5. In another example, the weight of the benzyl alcohol applied to the portion 36 ranges from about 1 time to about 2.25 times more than the weight of the electromagnetic radiation absorber applied to the portion 36.

In the example shown in FIG. 3, the detailing agent 16 is also selectively applied to the portion(s) 38 of the layer 24. The portion(s) 38 are not patterned with the fusing agent 12A or 12B and thus are not to become part of the final 3D object layer 40. Thermal energy generated during radiation exposure may propagate into the surrounding portion(s) 38 that do not have the fusing agent 12A or 12B applied thereto. The propagation of thermal energy may be inhibited, and thus the coalescence of the non-patterned build material portion(s) 38 may be prevented, when the detailing agent 16 is applied to these portion(s) 38.

After the agents 12A or 12B, 14, and 16 are selectively applied in the specific portion(s) 36, 37, 38 of the layer 24, the entire layer 24 of the polyamide build material composition 22 is exposed to electromagnetic radiation (shown as EMR in FIG. 3).

The electromagnetic radiation is emitted from the radiation source 34. The length of time the electromagnetic radiation is applied for, or energy exposure time, may be dependent, for example, on one or more of: characteristics of the radiation source 34; characteristics of the polyamide build material composition 22; and/or characteristics of the fusing agent 12A or 12B.

It is to be understood that the electromagnetic radiation exposure may be accomplished in a single radiation event or in multiple radiation events. In an example, the exposing of the polyamide build material composition 22 is accomplished in multiple radiation events. In a specific example, the number of radiation events ranges from 3 to 8. In still another specific example, the exposure of the polyamide build material composition 22 to electromagnetic radiation may be accomplished in 3 radiation events. It may be desirable to expose the polyamide build material composition 22 to electromagnetic radiation in multiple radiation events to counteract a cooling effect that may be brought on by the amount of the agents 12A or 12B, 14, and 16 that is applied to the build material layer 24. Additionally, it may be desirable to expose the polyamide build material composition 22 to electromagnetic radiation in multiple radiation events to sufficiently elevate the temperature of the build material composition 22 in the portion(s) 36, 37, without over heating the build material composition 22 in the non-patterned portion(s) 38.

The fusing agent 12A or 12B enhances the absorption of the radiation, converts the absorbed radiation to thermal energy, and promotes the transfer of the thermal heat to the build material composition 22 in contact therewith. In an example, the fusing agent 12A or 12B sufficiently elevates the temperature of the build material composition 22 in the portion 36 to a temperature above the melting point or within the melting range of the polyamide material, allowing coalescing/fusing (e.g., thermal merging, melting, binding, etc.) of the build material composition 12 to take place. The application of the electromagnetic radiation forms the 3D object layer 30, which, in some examples, includes a modified portion 48.

In some examples, the electromagnetic radiation has a wavelength ranging from 800 nm to 4000 nm, or from 800 nm to 1400 nm, or from 800 nm to 1200 nm. Radiation having wavelengths within the provided ranges may be absorbed (e.g., 80% or more of the applied radiation is absorbed) by the fusing agent 12A and 12B and may heat the polyamide build material composition 22 in contact therewith, and may not be substantially absorbed (e.g., 25% or less of the applied radiation is absorbed) by the non-patterned build material composition 22 in portion(s) 38.

In the example shown in FIG. 3, the 3D object layer 40 includes the modified portion 48. The modified portion 48 of the 3D object layer 40 corresponds with the portion 37 of the build material layer 24 that had been patterned with both the fusing agent 12A or 12B and the surface treating agent 14. The combination of the benzyl alcohol and heat during electromagnetic radiation exposure increases the solubility of the polyamide particles in the portion 37, thus enabling the particles to better coalesce. This results in the formation of the modified portion 48, which has reduced surface roughness, and may also have improved color uniformity, e.g., compared to portions of the 3D object layer 40 not exposed to the surface treating agent 14 during the method 100.

After the 3D object layer 40 is formed, additional layer(s) may be formed thereon to create an example of the 3D object. To form the next layer, additional polyamide build material composition 22 may be applied on the layer 40. The fusing agent 12A or 12B is then selectively applied on at least a portion of the additional build material composition 22, according to the 3D object model. The surface treating agent 14 may also be applied, for example, if decreased surface roughness is desired in the next layer. The detailing agent 16 may be applied in any area of the additional build material composition 22 where coalescence is not desirable. After the agent(s) 12A or 12B, 14, and 16 is/are applied, the entire layer of the additional build material composition 22 is exposed to electromagnetic radiation in the manner described herein. The application of additional polyamide build material composition 22, the selective application of the agent(s) 12A or 12B, 14, and 16, and the electromagnetic radiation exposure may be repeated a predetermined number of cycles to form the final 3D object in accordance with the 3D object model. As mentioned, it may not be desirable to apply the surface treating agent 14 on the innermost layers during 3D printing, in order to maintain the strength of the 3D object.

Some examples of the method 100 include repeating the applying of the polyamide build material composition 22, the selectively applying of the fusing agent 12A or 12B, the selectively applying of the surface treating agent 14, and the exposing, to form a predetermined number of 3D object layers and a 3D printed object, wherein the modified portion 48 extends around an exterior of the 3D printed object. In these examples, the surface treating agent 14 may be applied on the build material composition 22 that is at or adjacent to object edges, according to the 3D object model.

In some examples of the method 100, it may be desirable to form a predetermined number of 3D object layers (e.g., adjacent to one another) that have respective modified portions 48. In this example, the method 100 includes iteratively applying the polyamide build material composition 22 to form individual build material layers 24; selectively applying the fusing agent 12A or 12B on the individual build material layers 24 to form individual patterned portions 36; selectively applying the surface treating agent 14 onto at least a portion 37 of the individual patterned portions 36; and exposing the individual build material layers 24 to energy.

Printing with the Surface Treating Agent and Both Fusing Agents

Figure 4:
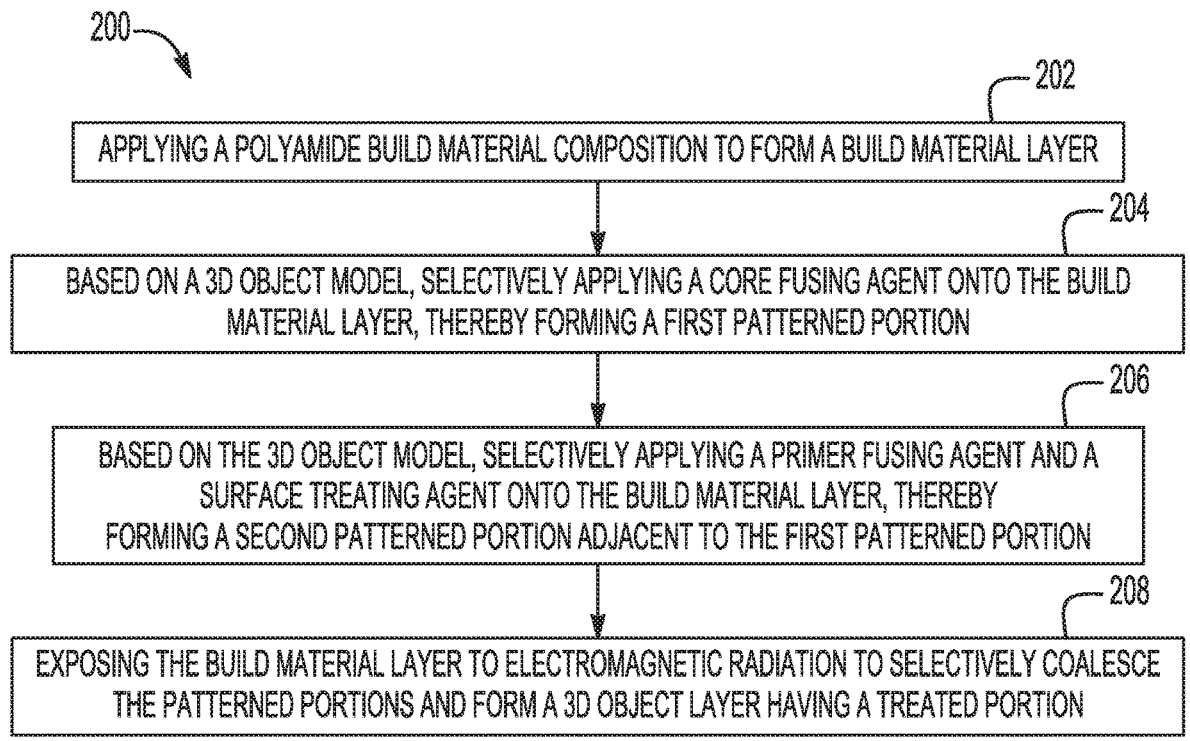
FIG. 4 is a flow diagram depicting another example of a 3D printing method.

Referring now to FIG. 4, an example of the method 200 which utilizes the surface treating agent 14 and both of the fusing agents 12A and 12B is depicted.

The method 200 shown in FIG. 4 includes applying a polyamide build material composition to form a build material layer (reference numeral 202); based on a 3D object model, selectively applying a core fusing agent onto the build material layer, thereby forming a first patterned portion (reference numeral 204); based on the 3D object model, selectively applying a primer fusing agent and a surface treating agent onto the build material layer, thereby forming a second patterned portion adjacent to the first patterned portion, wherein the surface treating agent includes an aqueous vehicle, a surfactant, and benzyl alcohol dissolved in the aqueous vehicle (reference numeral 206); and exposing the build material layer to electromagnetic radiation to selectively coalesce the patterned portions and form a 3D object layer having a modified portion (reference numeral 208).

Figure 5:
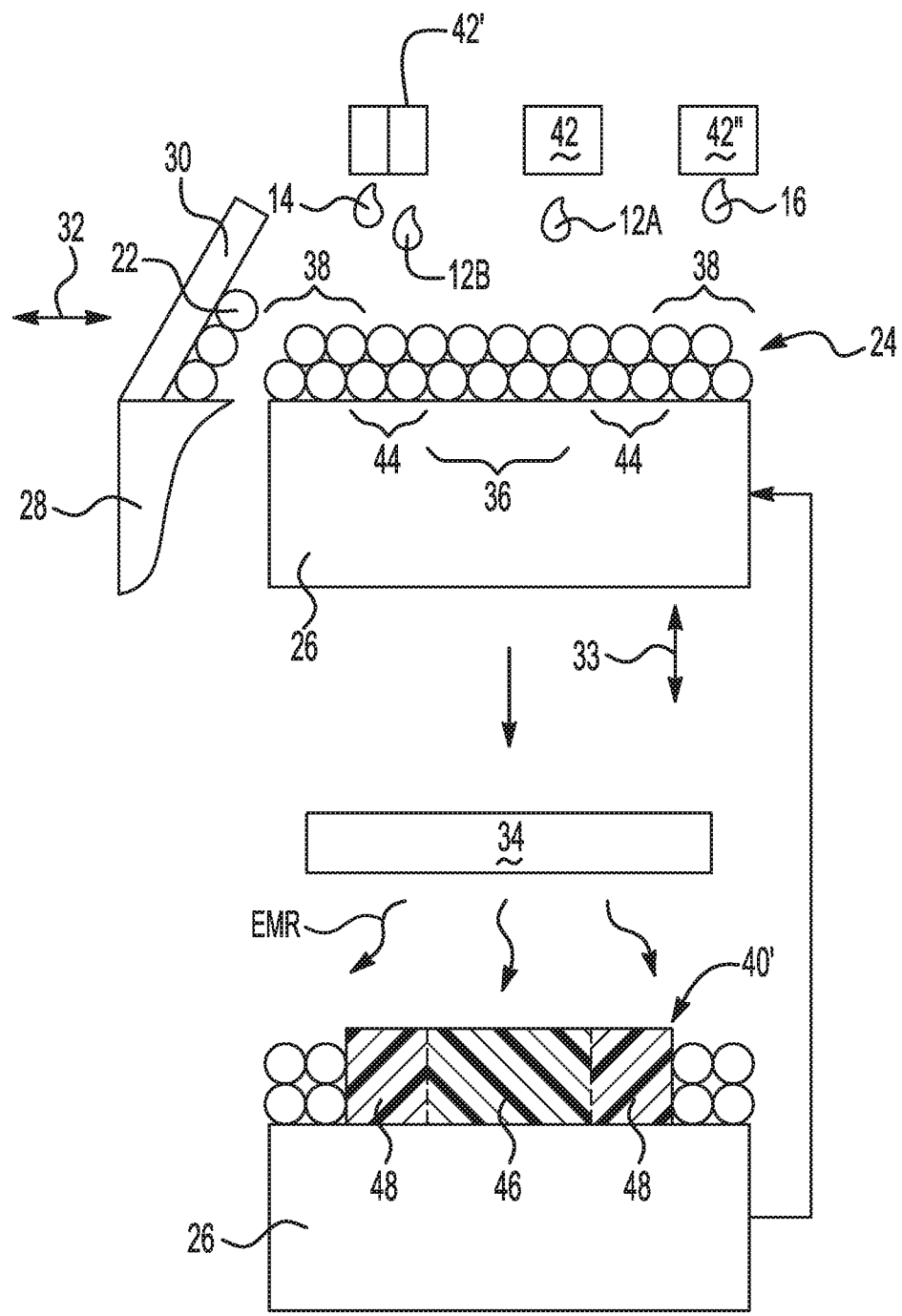
FIG. 5 is a schematic illustration of one example of the 3D printing method of FIG. 4.

The method 200 is shown schematically in FIG. 5. In FIG. 5, one layer 24 of the polyamide build material composition 22 is applied on the build area platform 26 as described in reference to FIG. 3. After the polyamide build material composition 22 has been applied, and prior to further processing, the build material layer 24 may be exposed to pre-heating as described in reference to FIG. 3.

In this example of the method 200, the core fusing agent(s) 12A is selectively applied on at least some of the polyamide build material composition 22 in the layer 24 to form a first patterned portion 36; and the primer fusing agent(s) 12B and the surface treating agent 14 are selectively applied on at least some of the polyamide build material composition 22 in the layer 24 to form second patterned portion(s) 37 that are adjacent to the first patterned portion 36. The first patterned portion 36 is generally located at an interior portion of the build material layer 24 and the second patterned portion 37 is generally located at an exterior portion of the build material layer 24 where it is desirable to impart enhanced solubility at one or more surface(s) of the 3D printed object layer 40'.

The volume of the core fusing agent 12A that is applied per unit of the polyamide build material composition 22 in the first patterned portion 36 may be sufficient to absorb and convert enough electromagnetic radiation so that the build material composition 22 in the patterned portion 36 will coalesce/fuse.

The volume of the primer fusing agent 12B that is applied per unit of the polyamide build material composition 22 in the second patterned portion 37 may be sufficient to absorb and convert enough electromagnetic radiation so that the polyamide build material composition 22 in the second patterned portion 37 will coalesce/fuse.

The volume of the surface treating agent 14 that is applied per unit of the polyamide build material composition 22 in the second patterned portion 37 may depend upon whether it is desirable to impart solubility at the voxel surface and/or through the voxel volume, upon the volume of polyamide build material composition 22 in the layer 24, and the volume of the fusing agent 12B that is applied.

In the example shown in FIG. 5, the detailing agent 16 is also selectively applied to the portion(s) 38 of the layer 24. The portion(s) 38 are not patterned with the fusing agent 12A or 12B and thus are not to become part of the final 3D object layer 40'.

After the agents 12A, 12B, 14, and 16 are selectively applied in the specific portion(s) 36, 37, and 38 of the layer 24, the entire layer 24 of the build material composition 22 is exposed to electromagnetic radiation (shown as EMR in FIG. 5). Radiation exposure may be accomplished as described in reference to FIG. 3.

In this example, the respective fusing agents 12A and 12B enhance the absorption of the radiation, convert the absorbed radiation to thermal energy, and promote the transfer of the thermal heat to the build material composition 22 in contact therewith. In an example, the fusing agents 12A and 12B sufficiently elevate the temperature of the build material composition 22 in the respective portions 36, 37 to a temperature above the melting point or within the melting range of the polyamide material, allowing coalescing/fusing (e.g., thermal merging, melting, binding, etc.) of the polyamide build material composition 22 to take place. The application of the electromagnetic radiation forms the 3D object layer 40', which, in this example, includes a core portion 46 (unmodified surface roughness) and modified portions 48 (reduced surface roughness) at opposed ends of the core portion 46.

FIG. 5 illustrates one example of how the core fusing agent 12A, the primer fusing agent 12B and the surface treating agent 14 may be used together to pattern a single build material layer 24.

When both fusing agents 12A and 12B are used to build up a 3D object, it may be desirable to utilize the core fusing agent 12A to form the core (e.g., the center or inner-most portion) of the 3D object, and it may be desirable to utilize the primer fusing agent 12B to form the outermost layers of the 3D object. The core fusing agent 12A can impart strength to the core of the 3D object, while the primer fusing agent 12B enables white or a color to be exhibited at the exterior of the 3D object. It is to be understood that the surface treating agent 14 may also be used to increase the solubility of the polyamide particles, thus improving coalescence during fusing and smoothing the portions 48 of the 3D object.

In some examples, it may be desirable to form a predetermined number of 3D object layers (e.g., adjacent to one another) that are modified portions 48. In some of these examples, the 3D object layer(s) may be outer layer(s) of the 3D printed object, and the fusing agent used to pattern these outer layer(s) is the primer fusing agent 12B. In these examples, prior to forming the outer layer(s), the method may further include forming a core of the 3D printed object by iteratively applying the polyamide build material composition 22 to form respective build material layers 24; selectively applying a core fusing agent 12A on the respective build material layers 10 to form respective patterned portions 36; and exposing the respective build material layers to energy.

Figure 6:
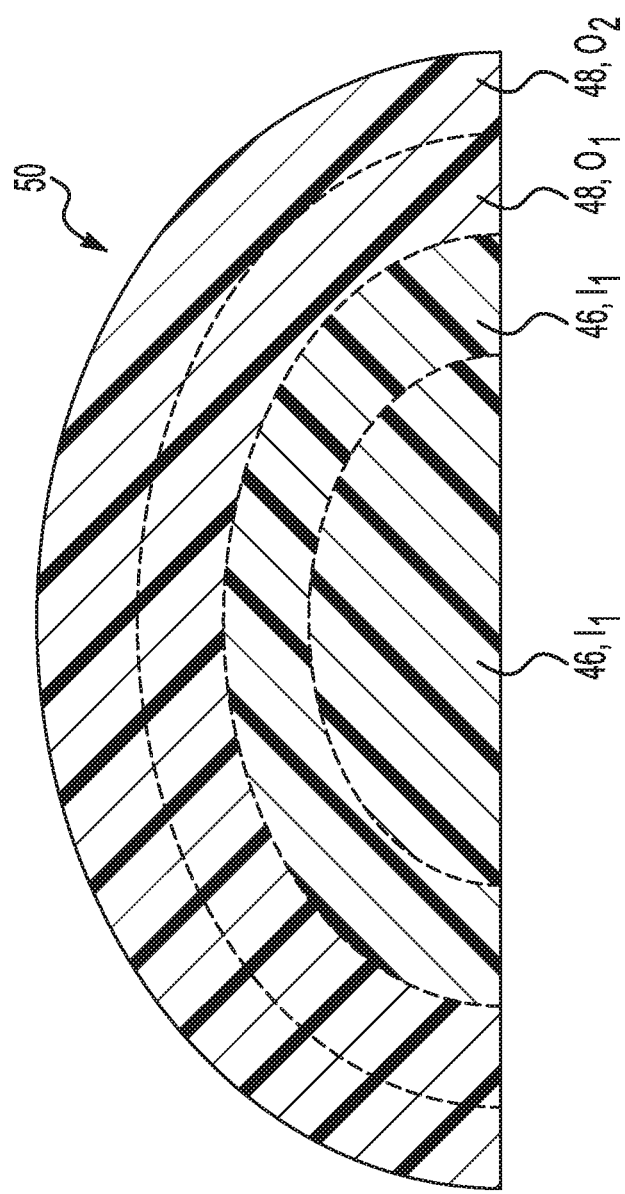
FIG. 6 is a cross-sectional view of an example 3D object.

An example of a 3D object 50 formed with the primer fusing agent 12B and the surface treating agent 14 and the core fusing agent 12A is shown in FIG. 6. To form this example of the 3D object 50, the core fusing agent 12A would be applied on multiple layers of the polyamide build material composition 22 to pattern and ultimately form the inner core portions 46, 11 and 46, 12 of the 3D printed object 50, and the primer fusing agent 12B and the surface treating agent 14 would be applied on multiple layers of the polyamide build material composition 22 to pattern and ultimately form the outermost modified portions 48, 01 and 48, 02 of the 3D printed object 50. After each build material layer 24 is patterned with the agent(s) 12A or 12B and 14, electromagnetic radiation may be applied to solidify the respective patterned build material layers. In this example, the outermost portions 48, 01 and 48, 02 have reduced surface roughness.

Figure 7:
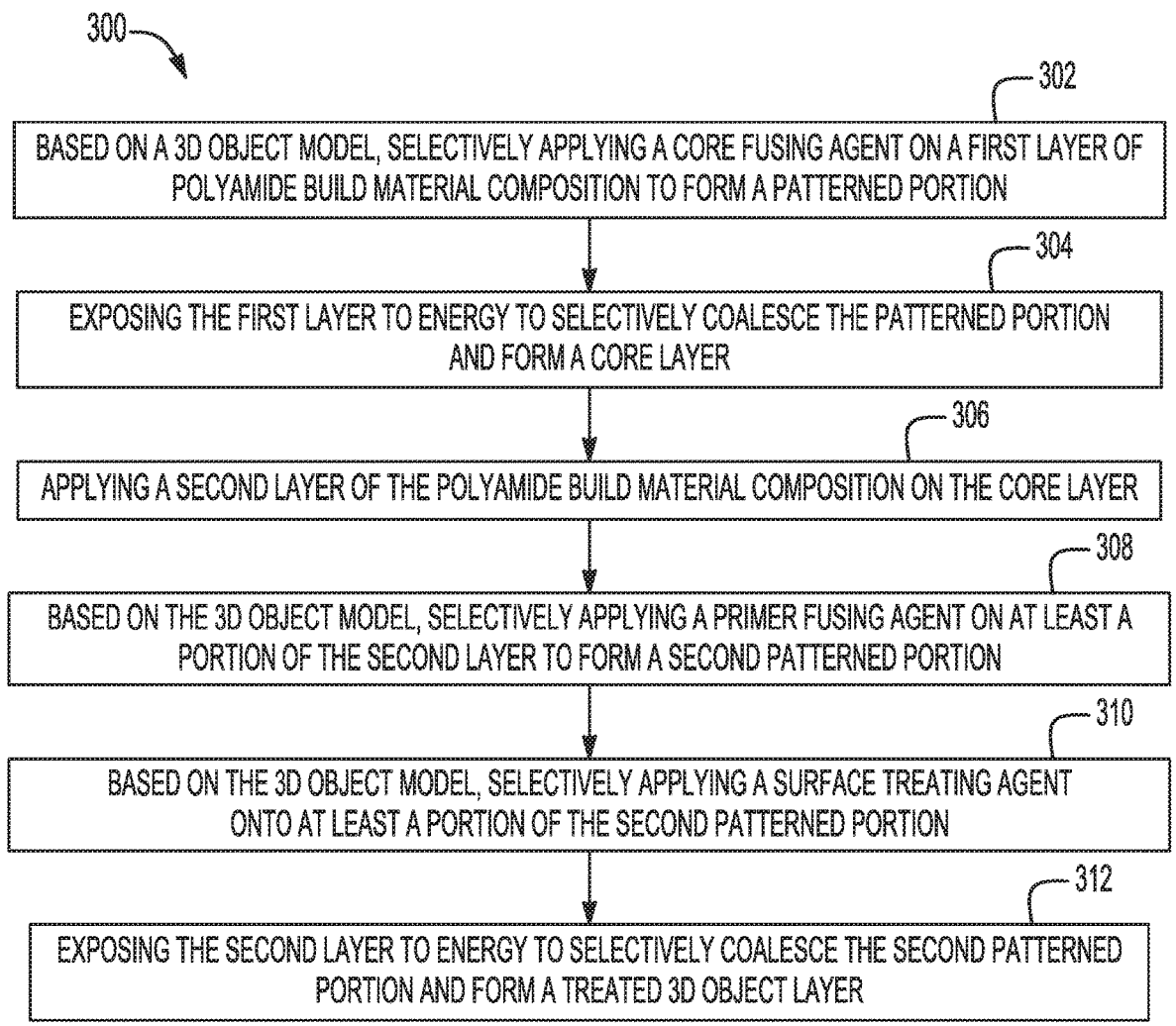
FIG. 7 is a flow diagram depicting another example of a 3D printing method.
Figure 8:
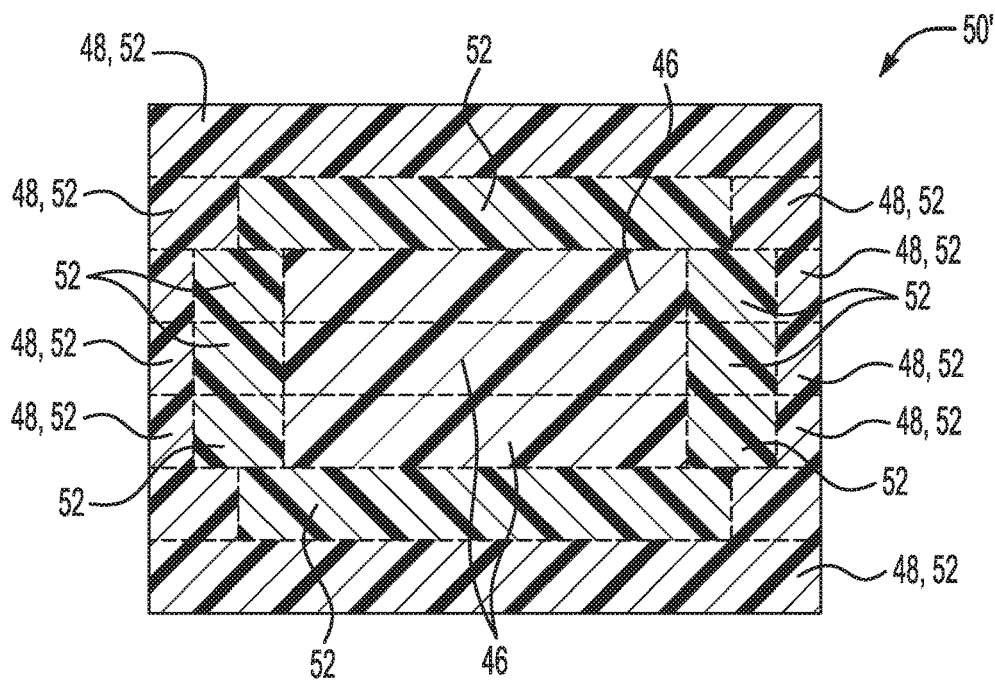
FIG. 8 is a cross-sectional view of another example 3D object.

Another example of the method 300 using each of these agents 12A, 12B, 14 is shown in FIG. 7, and an example of the resulting 3D object 50' is shown in FIG. 8.

The method 300 includes based on a 3D object model, selectively applying a core fusing agent on a first layer of polyamide build material composition to form a patterned portion (reference numeral 302); exposing the first layer to energy to selectively coalesce the patterned portion and form a core layer (reference numeral 304); applying a second layer of the polyamide build material composition on the core layer (reference numeral 306); based on the 3D object model, selectively applying a primer fusing agent on at least a portion of the second layer to form a second patterned portion (reference numeral 308); based on the 3D object model, selectively applying a surface treating agent on at least a portion of the second patterned portion, wherein the surface treating agent includes an aqueous vehicle, a surfactant, and benzyl alcohol (reference numeral 310); and exposing the second layer to energy to selectively coalesce the second patterned portion and form a 3D object layer (in this example, a primer layer) including a modified portion (reference numeral 312). Some examples of the method 300 further include selectively applying the primer fusing agent 12B and the surface treating agent 14 on the first layer at an area adjacent to the patterned portion, whereby the area coalesces to form a modified edge portion adjacent to the core layer.

An example of the 3D object 50' formed using the method 300 is shown in FIG. 8. To form this example of the 3D object 50', the outermost build material layer(s) and the outermost edges of the middle build material layers would be patterned with the primer fusing agent 12B and the surface treating agent 14 to form 3D object layers 52, each of which has modified portions 48. This example illustrates the modified portions 48 at the entire exterior of the 3D object 50', but it is to be understood that the surface treating agent 14 may be selectively applied so that portions of the exterior are modified to have reduced surface roughness, while other portions of the exterior are not modified. This may be desirable, for example, for an object that is to have some smooth area and some rough areas. In the example shown in FIG. 8, the innermost portions of the middle build material layers would be patterned with the core fusing agent 12A (and not with the surface treating agent 14) to form the core portions 46 of the object 50'.

In this example of the method 300, any number of core layers 46 (without modified portions 48) may be formed, and any number of 3D object layers 52 (some of which have modified portions 48) may be formed.

In one example of the method 300, a predetermined number of core layers 46 are formed by iteratively applying the polyamide build material composition 22 to form respective build material layers 24; selectively applying the core fusing agent 12A on the respective build material layers 24 to form respective patterned portions 36; and exposing the respective build material layers to energy. In some examples, the predetermined number of core layers 62 is formed on top of a predetermined number of 3D object layers 52 having respective modified portions 48. In these examples, the method 300 may also include forming a second predetermined number of 3D object layers 52 having respective modified portions 48 on the predetermined number of core layers 46 by iteratively applying the polyamide build material composition 22 to form additional individual build material layers 24; selectively applying the primer fusing agent 12B on the additional individual build material layers 24 to form additional individual patterned portions 36; selectively applying the surface treating agent 14 onto at least a portion 37 of the additional individual patterned portions 36; and exposing the additional individual build material layers to energy.

In the example shown in FIG. 8, the coloring agent 18 (not shown in FIG. 8) may also be applied with the primer fusing agent 12B to generate color at the exterior surfaces of the object 50'. For example, the coloring agent 18 may be applied with the primer fusing agent 12B and the surface treating agent 14 on the build material that forms the 3D object layers 52, 48. Since the primer fusing agent 12B is clear or slightly tinted and the polyamide build material composition 12 is white or off-white, the color of the coloring agent 18 will be the color of the resulting 3D object layers 52, 48. The colorant of the coloring agent 18 becomes embedded throughout the coalesced/fused build material composition of the 3D object layers 52, 48. In this example, the portions of the 3D object layers 52 without the modified portion 48 are white or slightly tinted and may or may not have the coloring agent 18 applied thereto. These portions may function as intermediate layers 54 and may help to form a mask over the black (or dark colored) core layers 46 because they optically isolate the core layers 64.

While several variations of the objects 50, 50' and the combinations of fusing agents 12A, 12B have been described, it is to be understood that the fusing agents 12A, 12B may be used to form any desirable 3D object.

In any of the examples of the method 100, 200, 300 disclosed herein, any of the agents (fusing agent 12, surface treating agent 14, detailing agent 16 and/or coloring agent 18) may be dispensed from an applicator 42, 42', 42" (shown in FIG. 3 and FIG. 5). The applicator(s) 42, 42', 42" may each be a thermal inkjet printhead, a piezoelectric printhead, a continuous inkjet printhead, etc., and the selective application of the fusing agent 12, surface treating agent 14, detailing agent 16 and/or coloring agent 18 may be accomplished by thermal inkjet printing, piezo electric inkjet printing, continuous inkjet printing, etc. The controller may process data, and in response, control the applicator(s) 42, 42', 42" to deposit the fusing agent 12, surface treating agent 14, detailing agent 16 and/or coloring agent 18 onto predetermined portion(s) of the build material composition 22. It is to be understood that the applicators 42, 42', 42" may be separate applicators or a single applicator with several individual cartridges for dispensing the respective agents.

It is to be understood that the selective application of any of the fusing agent 12, surface treating agent 14, detailing agent 16 and/or coloring agent 18 may be accomplished in a single printing pass or in multiple printing passes. In some examples, the agent(s) is/are selectively applied in a single printing pass. In some other examples, the agent(s) is/are selectively applied in multiple printing passes. In one of these examples, the number of printing passes ranging from 2 to 4. In still other examples, 2 or 4 printing passes are used. It may be desirable to apply the fusing agent 12, surface treating agent 14, detailing agent 16 and/or coloring agent 18 in multiple printing passes to increase the amount, e.g., of the energy absorber, hydrophilic polymer, colorant, etc. that is applied to the build material composition 22, to avoid liquid splashing, to avoid displacement of the build material composition 12, etc.

In the examples disclosed herein, the 3D object 50, 50' may be printed in any orientation. For example, the 3D object 50, 50' can be printed from bottom to top, top to bottom, on its side, at an angle, or any other orientation. The orientation of the 3D object 50, 50' can also be formed in any orientation relative to the layering of the polyamide build material composition 22. For example, the 3D object 50, 50' can be formed in an inverted orientation or on its side relative to the build layering within the polyamide build material composition 22. The orientation of the build within the polyamide build material composition 22 can be selected in advance or even by the user at the time of printing, for example.

To further illustrate the present disclosure, an example is given herein. It is to be understood that this example is provided for illustrative purposes and is not to be construed as limiting the scope of the present disclosure.

Example

A control surface treating agent and two examples treating agents were prepared. The control surface treating agent did not include benzyl alcohol, and the two example formulations included benzyl alcohol. The formulations are shown in Table 1. The wt % represents the active amount, except for the chelating agent which represents the amount used "as is".

TABLE 1

| Ingredient Type | Specific Component | Control STA (wt %) | STA 1 (wt %) | STA 2 (wt %) |
|---|---|---|---|---|
| Co-solvent | Polyethylene Glycol 200 | — | 50.0 | — |
|  | 1-(2-hydroxyethyl)-2-pyrrolidone | 4.0 | — | 50.0 |
| Surface Treatment Agent | Benzyl Alcohol | — | 15.0 | 15.0 |
| Surfactant | TERGITOL ® 15-S-9 | 0.85 | 0.8 | 0.8 |
| Anti-Kogation Agent | CRODAFOS ® 03A | 0.50 | — | — |

TABLE 1-continued

| Ingredient Type | Specific Component | Control STA (wt %) | STA 1 (wt %) | STA 2 (wt %) |
|---|---|---|---|---|
| Buffer | TRIZMA | 0.10 | — | — |
| Chelating Agent | TRILON ® M | 0.02 | — | — |
| Antimicrobial Agent | ACTICIDE ® B20 | 0.18 | — | — |
|  | ACTICIDE ® M20 | 0.07 | — | — |
|  | Water | Balance | Balance | Balance |

The example agents, STA 1 and STA 2, were then printed with a thermal inkjet printer to determine the printability and decap performance. A magenta dye was included in each formulation to enhance the visibility of the print. The print results indicated very good decap performance and nozzle health. Thus, the example surface treating agents exhibited acceptable printing performance.

The control and example surface treating agents were then used in a 3D printing process to determine their respective effects on the surface roughness and color uniformity of 3D printed objects. The control objects C1 and C2 were formed with the control STA, example objects 1A and 1B were formed with STA 1, and example objects 2A and 2B were formed with STA 2.

The 3D printed objects were rectangular prisms with a hollow center portion that extended through the length of the prisms. The polymeric build material was polyamide-12. The polyamide-12 build material was spread out into thin layers. A fusing agent, including carbon black as the electromagnetic radiation absorber, was inkjet printed in each build material layer in a respective pattern for that portion of the rectangular prism. The control or example surface treating agents were printed with the fusing agent in the outermost build material layers. The fusing agent loading was 1 drop per pixel and the surface treating agent loading was 1 or 2 drops per pixel. Each patterned layer was exposed to IR radiation.

Figure 9A:
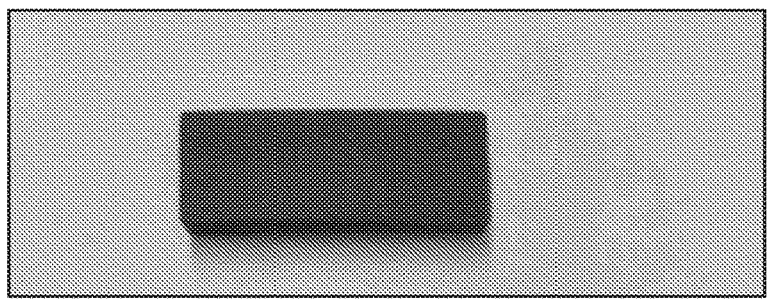
FIGS. 9A through 9C are black and white reproductions of an originally colored photograph depicting a control part (FIG. 9A) formed with a control surface treating agent, and two examples parts (FIG. 9B and FIG. 9C) formed using different examples of the surface treating agent disclosed herein.
Figure 9B:
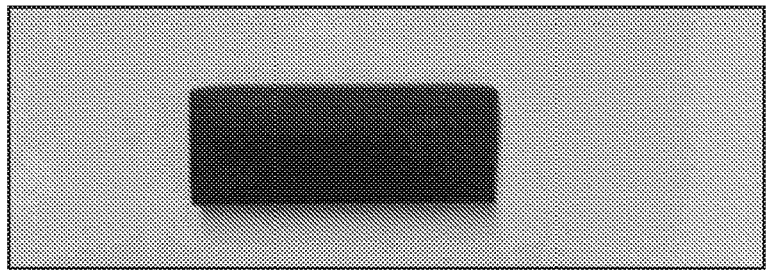
Figure 9C:
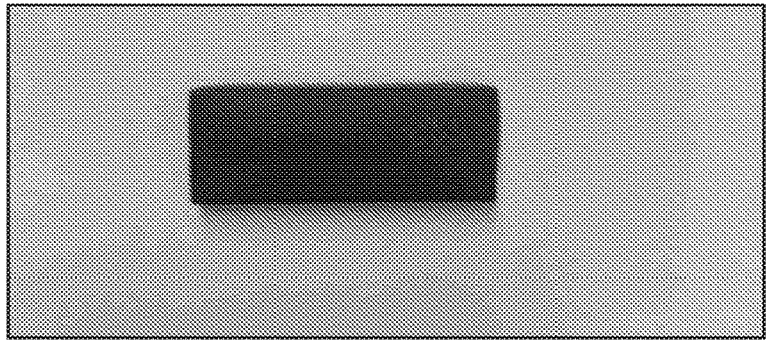

Photographs of some of the 3D printed objects were taken. Black and white reproductions are shown in FIG. 9A through 9C. Control object C1 is shown in FIG. 9A, example object 1A is shown in FIG. 9B and example object 2A is shown in FIG. 9C. The images illustrate that the example objects were visibly smoother and darker than the control object. The visual results were confirmed with both surface roughness and L* measurements.

The surface roughness of the control objects C1 and C2 and of the example objects 1A, 1B, 2A, 2B were measured using a Mitutoyo surface roughness gauge. The measurements were collected as an average of three measurements on the visibly smoothest areas of each object, both on the top and on the bottom. The results are shown in Table 2.

TABLE 2

Surface Roughness Results

|  | Location | Roughness (μm) |
|---|---|---|
| Control Object C1 | Top | 4.804 |
|  | Bottom | 4.825 |
| Control Object C2 | Top | 4.767 |
|  | Bottom | 3.209 |
| Example Object 1A | Top | 2.971 |
|  | Bottom | 3.339 |
| Example Object 1B | Top | 3.507 |
|  | Bottom | 3.805 |
| Example Object 2A | Top | 2.705 |
|  | Bottom | 2.612 |
| Example Object 2B | Top | 3.721 |
|  | Bottom | 1.847 |

The surface measurements correlate with the visual results. In particular, the example objects are smoother, on average, than the control objects.

L* measurements were taken for each of the 3D objects. The L* measurements were taken using an X-Rite® eXact™ spectrophotometer. L* is a measure for lightness/whiteness ranging from black (L*=0) to white (L*=100). The L* results are shown in Table 3. Table 3 depicts the location of the 3D object where the measurement was taken (top or bottom) and the L* value.

TABLE 3

L* Results

|  | Location | L* |
|---|---|---|
| Control Object C1 | Top | 32.3 |
|  | Bottom | 31.3 |
| Control Object C2 | Top | 34.4 |
|  | Bottom | 30.4 |
| Average |  | 32.1 |
| Example Object 1A | Top | 32.2 |
|  | Bottom | 35.4 |
| Example Object 1B | Top | 33.2 |
|  | Bottom | 31.2 |
| Average |  | 33.0 |
| Example Object 2A | Top | 36.1 |
|  | Bottom | 33.5 |
| Example Object 2B | Top | 32.6 |
|  | Bottom | 31.8 |
| Average |  | 33.5 |

The difference in L* values between the example objects and the control objects is negligible. The L* values indicate that there was no detriment to the final color of the example objects, even with the improvement in surface roughness.

It is to be understood that the ranges provided herein include the stated range and any value or sub-range within the stated range. For example, from about 0.01 wt % to about 3 wt % should be interpreted to include not only the explicitly recited limits of from about 0.01 wt % to about 3 wt %, but also to include individual values, such as about 0.25 wt %, about 0.55 wt %, about 1.74 wt %, about 2.03 wt %, about 2.9 wt %, etc., and sub-ranges, such as from about 0.2 wt % to about 2.8 wt %, from about 1 wt % to about 3 wt %, from about 0.5 wt % to about 2.5 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A multi-fluid kit for three-dimensional (3D) printing, comprising:
   a fusing agent including:
     an electromagnetic radiation absorber; and
     a first aqueous vehicle; and
   a surface treating agent including:
     a second aqueous vehicle;
     a surfactant; and
     benzyl alcohol dissolved in the second aqueous vehicle.

2. The multi-fluid kit as defined in claim 1 wherein the benzyl alcohol is present in an amount ranging from about 2 wt % to about 20 wt % based on a total weight of the surface treating agent.

3. The multi-fluid kit as defined in claim 1 wherein the second aqueous vehicle includes water and a solvent for benzyl alcohol having a boiling point of 150° C. or higher.

4. The multi-fluid kit as defined in claim 3 wherein the solvent for benzyl alcohol is selected from the group consisting of polyethylene glycol having a weight average molecular weight ranging from about 190 Daltons to about 420 Daltons, 1-(2-hydroxyethyl)-2-pyrrolidone, glycerol, propylene glycol, and combinations thereof.

5. The multi-fluid kit as defined in claim 3 wherein the solvent for benzyl alcohol is present in an amount ranging from about 20 wt % to about 60 wt % based on the total weight of the surface treating agent.

6. The multi-fluid kit as defined in claim 1 wherein the fusing agent is a core fusing agent and the electromagnetic radiation absorber has absorption at least at wavelengths ranging from 400 nm to 780 nm.

7. The multi-fluid kit as defined in claim 1 wherein the fusing agent is a primer fusing agent and the electromagnetic radiation absorber exhibits absorption at wavelengths ranging from 800 nm to 4000 nm and transparency at wavelengths ranging from 400 nm to 780 nm.

8. A method for three-dimensional (3D) printing, comprising:
   applying a polyamide build material composition to form a build material layer;
   based on a 3D object model, selectively applying a fusing agent on at least a portion of the build material layer, thereby forming a patterned portion;
   based on the 3D object model, selectively applying a surface treating agent onto at least a portion of the patterned portion, the surface treating agent including:
     an aqueous vehicle;
     a surfactant; and
     benzyl alcohol dissolved in the aqueous vehicle; and
   after the selectively applying the surface treating agent, exposing the build material layer to electromagnetic radiation to selectively coalesce the patterned portion and form a 3D object layer.

9. The method as defined in claim 8, wherein:
the 3D object layer is an outer layer of a 3D printed object;
the fusing agent is a primer fusing agent; and
prior to forming the outer layer, the method further comprises forming a core of the 3D printed object by:
   iteratively applying the polyamide build material composition to form respective build material layers;
   selectively applying a core fusing agent on the respective build material layers to form respective patterned portions; and
   exposing the respective build material layers to the electromagnetic radiation.

10. The method as defined in claim 9 wherein the benzyl alcohol and a temperature during the exposing at least partially solubilize the polyamide build material in the outer layer, thereby reducing its surface roughness.

11. The method as defined in claim 9, further comprising forming a predetermined number of outer layers by:
   iteratively applying the polymeric build material composition to form individual build material layers;
   selectively applying the primer fusing agent on the individual build material layers to form individual patterned portions;
   selectively applying the surface treating agent onto at least a portion of the individual patterned portions; and
   exposing the individual build material layers to the electromagnetic radiation.

12. The method as defined in claim 8 wherein the aqueous vehicle includes water and a solvent for benzyl alcohol having a boiling point of 150° C. or higher.

13. The method as defined in claim 12 wherein:
the benzyl alcohol is present in an amount ranging from about 2 wt % to about 20 wt % based on a total weight of the surface treating agent; and
the solvent of benzyl alcohol is present in an amount ranging from about 20 wt % to about 60 wt % based on the total weight of the surface treating agent.

14. A three-dimensional (3D) printed article generated by the method of claim 8.

15. The 3D printed article as defined in claim 14 wherein the 3D object layer is an outermost layer of the 3D printed article, and wherein a surface roughness of the outermost layer is 3 μm or less.

* * * * *